United States Patent
Inoue et al.

(10) Patent No.: US 7,142,832 B2
(45) Date of Patent: Nov. 28, 2006

(54) HIGH-FREQUENCY DEVICE

(75) Inventors: Tatsuya Inoue, Osaka (JP); Hideaki Tokunaga, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 565 days.

(21) Appl. No.: 10/636,108

(22) Filed: Aug. 7, 2003

(65) Prior Publication Data

US 2004/0087286 A1    May 6, 2004

(30) Foreign Application Priority Data

| Aug. 8, 2002 | (JP) | ............................. 2002-231395 |
| Aug. 8, 2002 | (JP) | ............................. 2002-231396 |
| Aug. 8, 2002 | (JP) | ............................. 2002-231397 |
| Aug. 8, 2002 | (JP) | ............................. 2002-231398 |
| Aug. 8, 2002 | (JP) | ............................. 2002-231399 |
| Aug. 8, 2002 | (JP) | ............................. 2002-231400 |

(51) Int. Cl.
   *H04B 1/04*    (2006.01)
(52) U.S. Cl. .......................... 455/129; 455/82; 455/83; 375/261; 375/219; 375/220; 343/795
(58) Field of Classification Search ................ 455/130, 455/129, 575.7, 82, 83; 375/261, 219, 220; 361/321.3; 343/795
See application file for complete search history.

(56) References Cited

U.S. PATENT DOCUMENTS

| 4,729,058 | A | * | 3/1988 | Gupta et al. | ............. 361/321.3 |
| 4,868,575 | A | * | 9/1989 | Mok et al. | ................... 342/373 |
| 5,375,256 | A | | 12/1994 | Yokoyama et al. | |
| 6,127,884 | A | * | 10/2000 | Rishi | ........................... 329/304 |
| 6,720,926 | B1 | * | 4/2004 | Killen et al. | ......... 343/700 MS |

FOREIGN PATENT DOCUMENTS

JP    2001-127663 A    5/2001

* cited by examiner

*Primary Examiner*—Matthew D. Anderson
*Assistant Examiner*—Sanh Phu
(74) *Attorney, Agent, or Firm*—RatnerPrestia

(57) ABSTRACT

A high-frequency device includes an antenna terminal, a signal line connected to the antenna terminal, a high-frequency signal processing circuit connected to the signal line, a capacitance element having one end connected to the signal line and other end grounded, and an inductor having one end connected to the signal line and other end grounded. The high-frequency device can protect the high-frequency signal processing circuit from a high voltage noise, such as a static electricity, having a frequency close to a signal pass band.

9 Claims, 23 Drawing Sheets

HIGH-FREQUENCY DEVICE

FIELD OF THE INVENTION

The present invention relates to a high-frequency device for use in a mobile communications apparatus, such as a mobile telephone.

BACKGROUND OF THE INVENTION

As mobile communications apparatuses, such as mobile telephones, have small sizes, high-frequency devices used in the apparatuses are also demanded for having reduced dimensions. It is known that internal circuits in mobile communications apparatuses may be broken down by static electricity entering from the antenna terminal. The static electricity may be high, for example, thousands kilovolts per nanosecond.

FIG. 31 illustrates a conventional high-frequency device disclosed in Japanese Patent Laid-Open Publication No. 2001-127663. The conventional high-frequency device includes a high-pass filter (HPF) 1003 including a capacitor and an inductor and connected between an antenna terminal 1001 and a switching circuit 1002 for protecting the switching circuit 1002.

In order to have a large attenuation of signals of frequencies other than a passing band, the HPF 1003 requires to include more numbers of capacitors and inductors connected in multiple stages. The HPF 1003 including many capacitors and inductors has an insertion loss and may cause the high-frequency device to have a large size. Accordingly, as the size of the device is limited, the conventional high-frequency device can hardly have sufficient characteristics.

When a high-voltage noise, e.g., static electricity, having a frequency close to the passing band enters the conventional high-frequency device, the electricity is transferred from the antenna terminal 1001 via the HPF 1003 to the circuit 1002, thus breaking the circuit 1002.

SUMMARY OF THE INVENTION

A high-frequency device includes an antenna terminal, a signal line connected to the antenna terminal, a high-frequency signal processing circuit connected to the signal line, a capacitance element having one end connected to the signal line and other end grounded, and an inductor having one end connected to the signal line and other end grounded.

The high-frequency device can protect the high-frequency signal processing circuit from a high voltage noise, such as a static electricity, having a frequency close to a signal pass band.

DETAIL DESCRIPTION OF THE PREFERRED EMBODIMENTS (Embodiment 1)

Figure 1:
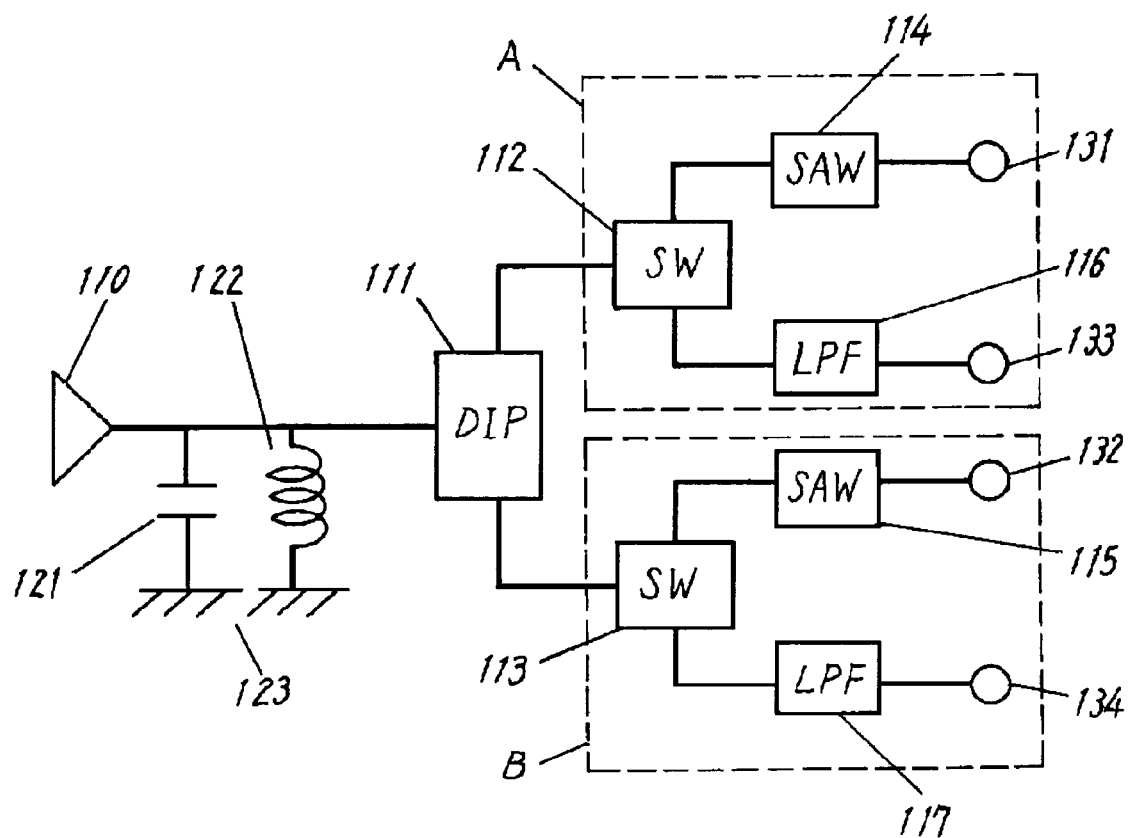
FIG. 1 is a circuit block diagram of a high-frequency device according to exemplary embodiments 1 to 3 of the present invention.

FIG. 1 is a circuit block diagram of a high-frequency device according to exemplary embodiment 1. The high-frequency device can be used as an antenna duplexer in a mobile telephone of the GSM/DCS dual band communications system, which is standardized in Europe. An antenna terminal 110 is connected to a diplexer 111 for separating and combining respective signals of the GSM band and the DCS band. In FIG. 1, a portion A processes the signal of the GSM band, and a portion B processes the signal of the DCS band. The diplexer 111 is connected to switches 112 and 113 for switching between a transmission and a reception. The switches 112 and 113 are connected to low pass filters (LPFs) 116 and 117 and connected to SAW filters 114 and 115 functioning as band pass filters for passing desired frequency bands, respectively. The filters 114, 115, 116, and 117 are connected to ports 131, 132, 133, and 134, respectively. The switches 112 and 113 are implemented by semiconductor devices, e.g. diodes.

Respective one ends of a capacitor 121 having a capacitance of 3 pF and an inductor 122 having an inductance of 18 nH are connected to a signal line between the antenna terminal 110 and the diplexer 111. Respective other ends of the capacitor 121 and the inductor 122 are connected to a grounding terminal 123.

Having the capacitance being as small as possible and being not larger than 10 pF, the capacitor 121 can prevent an insertion loss at the passing bands from increasing and does not interrupt an effect for eliminating a static electricity. Having the capacitance larger than 10 pF, the capacitor 121 may increase the insertion loss at the passing bands.

Having the inductance not larger than 50 nH, the inductor 122 has a large effect of eliminating an static electricity. Having the inductance exceeding 50 nH, the inductor 122 may decrease the effect. Having the inductance not smaller than 3 nH, the inductor 122 can reduce the insertion loss at the passing bands.

The high-frequency device having the above structure can protect the SAW filters 114 and 115 without increasing the insertion loss of the passing bands.

Figure 4:
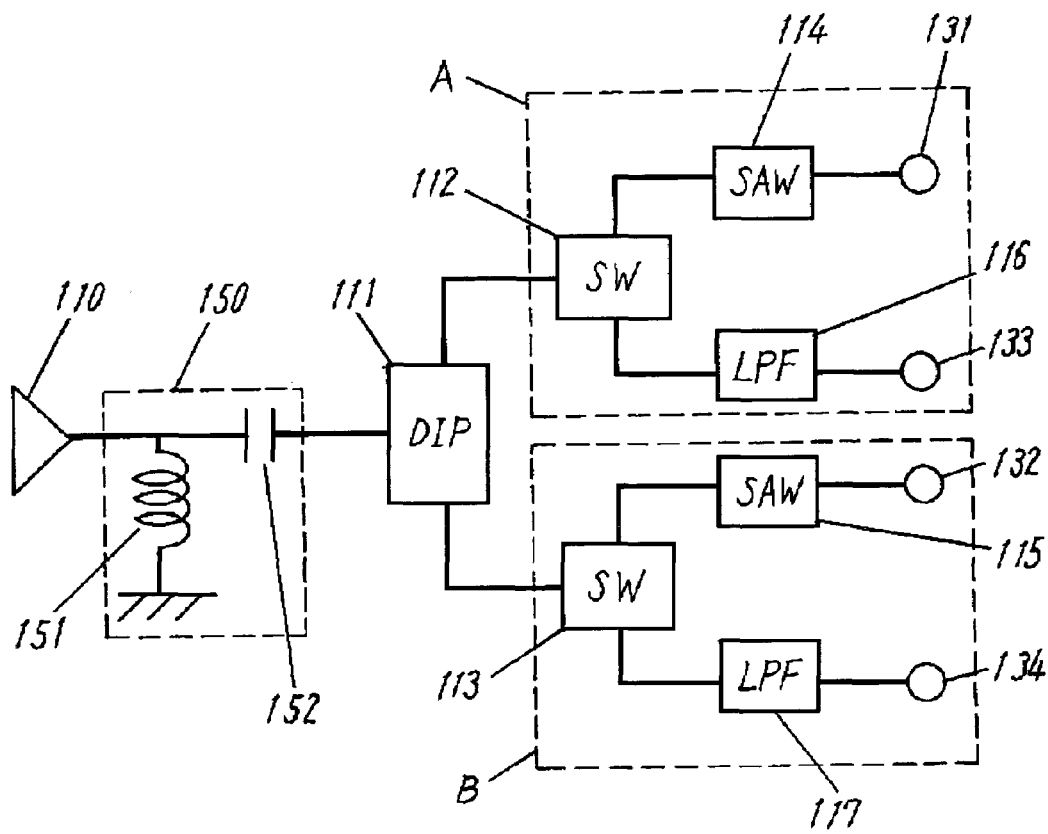
FIG. 4 is a circuit diagram of a high-frequency device of comparative example 1.

For verifying effects of the high-frequency device of embodiment 1, a high-frequency device of comparative example 1 including a high-pass filter (HPF) 150 shown in FIG. 4 was prepared. Other portions of the device of comparative example 1 are the same as those of the device of embodiment 1. In consideration with the insertion loss of the passing bands, the HPF 150 shown in FIG. 4 includes an inductor 151 having an inductance of about 100 nH and a capacitor 152 having a capacitance of about 33 pF. Upon receiving a static electricity from an antenna terminal 110, the HPF 150 did not completely eliminate a high-voltage component of the static electricity having frequencies close to the passing bands. The smaller the inductance of the inductor 151 has, the greater the insertion loss at the passing bands in the HPF 150 was increased. Since having a large capacitance of 33 pF, the capacitor 152 interrupted the HPF 150 from eliminating the static electricity at high frequencies close to the passing bands.

Figure 32:
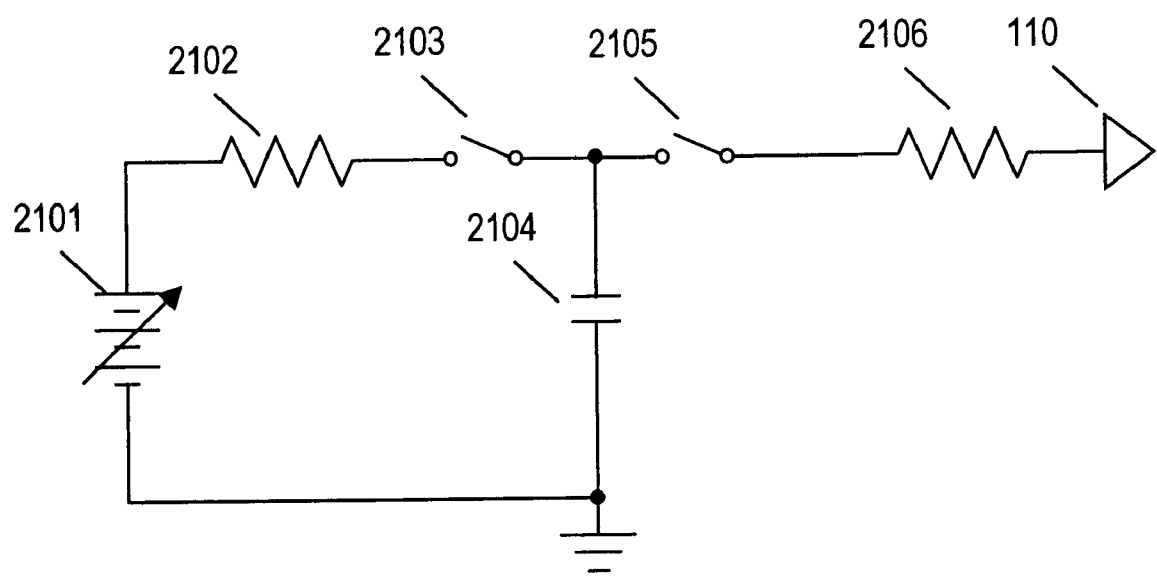
FIG. 32 illustrates a circuit for testing the high-frequency device according to embodiment 1 in static electricity.

The high frequency devices of embodiment 1 and comparative example 1 were tested in static electricity with a circuit shown in FIG. 32. Upon a switch 2103 being turned on, a direct current source 2101 applies a predetermined voltage to a capacitor 2104 having a capacitance of 150 pF to charge the capacitor. Then, upon the switch 2103 being turned off and a switch 2105 being turned on, the capacitor 2104 applies an electrical charge as a static-electricity pulse to the antenna terminal 110 through a resistor 2106 having a resistance of 330Ω. A waveform of a voltage loaded to the diplexer 111 caused by the static-electricity pulse was measured.

Figure 5:
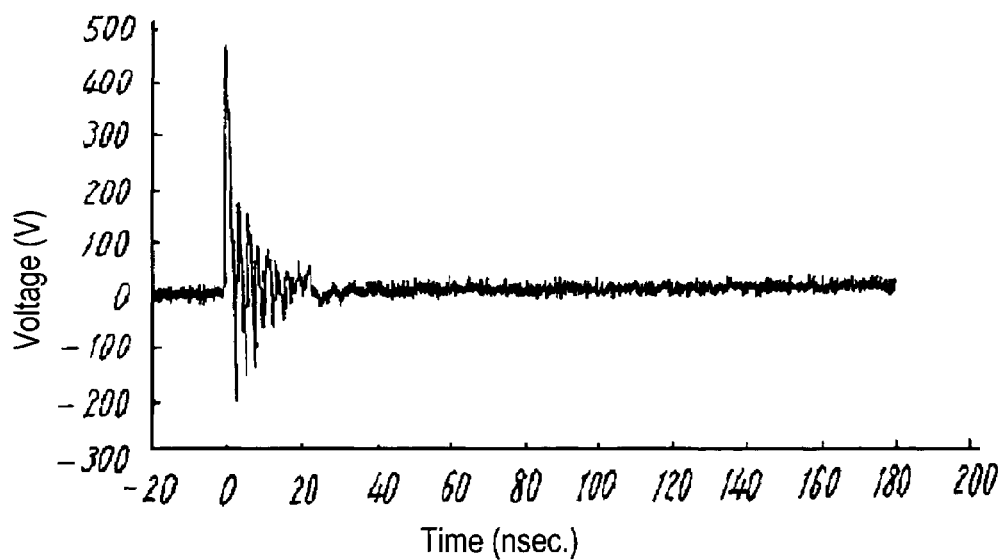
FIG. 5 illustrates a profile of eliminating a static electricity of the high-frequency device of embodiment 1.
Figure 6:
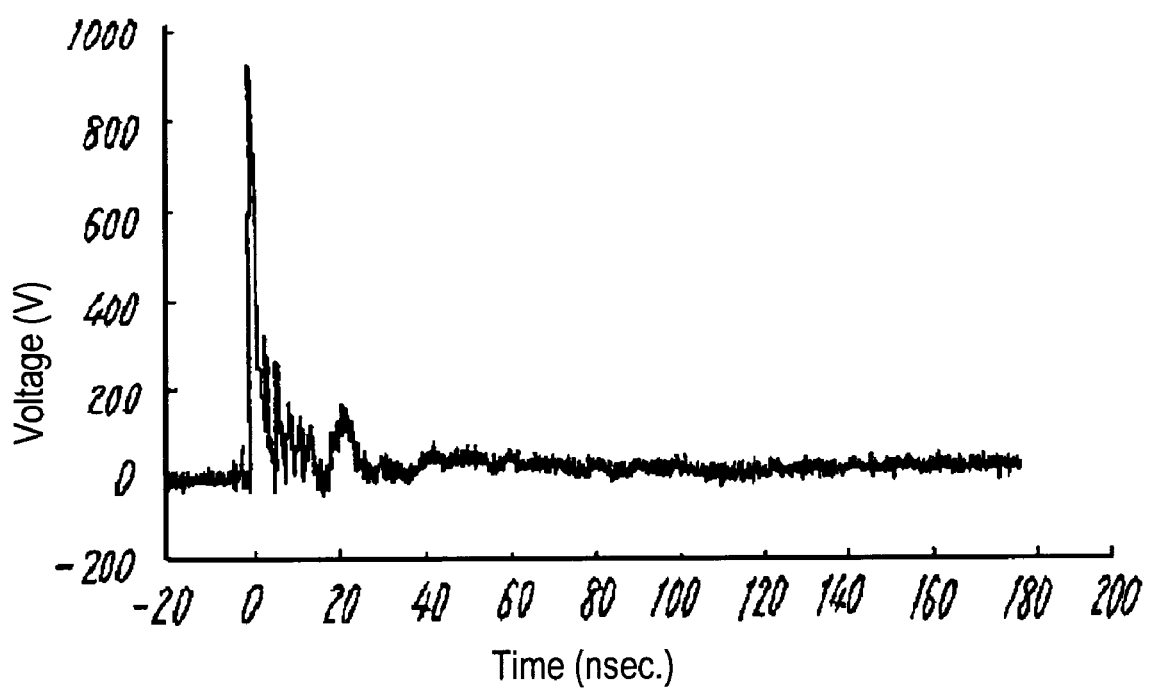
FIG. 6 illustrates a profile of eliminating a static electricity of the high-frequency device of comparative example 1 shown in FIG. 4.

FIG. 5 and FIG. 6 illustrate voltages loaded to circuits after the diplexers 111 of the high-frequency devices of embodiment 1 and comparative example 1, respectively, when a static electricity of 8 kV is discharged into the antenna terminal 110 by contact.

As shown in FIG. 5, the high-frequency device of embodiment 1 allows the loaded voltage to be about 470V during nanoseconds. The high-frequency device of comparative example 1, however, permits the loaded voltage of 950V during nanoseconds, as shown in FIG. 6.

As the loaded voltage is almost a half the voltage for the high-frequency device of comparative example 1, the high-frequency device of embodiment 1 can significantly reduce the loaded voltage.

More specifically, the capacitor 121 and the inductor 122 connected in parallel to each other between the ground and the signal line between the antenna terminal 110 and the diplexer 111 prevent the circuits after the diplexer 111 from receiving the high voltage, and allow a desired signal to be transmitted without increasing the insertion loss at the passing bands. While a high voltage noise, such as the static electricity, is bypassed to the grounding terminal 123 through the inductor 122, a high-frequency component at a rise of the noise which is not eliminated by the inductor 122 is attenuated by the capacitor 121.

As a result, the high-frequency device of embodiment 1 can protect the switches 112 and 113 and the SAW filters 114 and 115, which may receive an adverse effect of high-voltage noises, securely, hence having an operational reliability improved.

(Embodiment 2)

Figure 2:
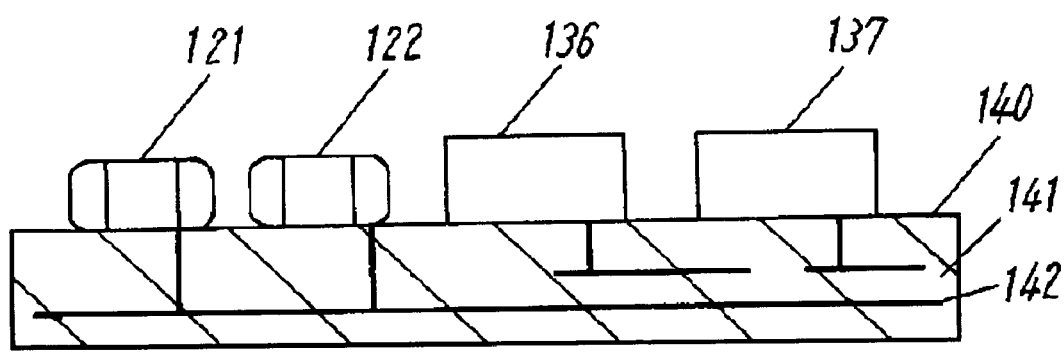
FIG. 2 is a cross sectional view of the high-frequency device according to embodiment 2.

FIG. 2 is a cross sectional view of a high-frequency device according to exemplary embodiment 2 of the present invention. A circuit of the high-frequency device is identical to that of embodiment 1 shown in FIG. 1 and will be explained in no more detail.

As shown in FIG. 2, a ceramic laminated substrate 140 includes ceramic layers 141 and conductive patterns 142 stacked alternately. An antenna terminal 110, a diplexer 111, switches 112 and 113 excluding diodes, LPFs 116 and 117, and ports 131, 132, 133, and 134 (not shown) are provided on and in the ceramic laminated substrate 140. A diode 136, a SAW filter 137, a capacitor 121, and an inductor 122 are surface-mounted on the upper side of the ceramic laminated substrate 140, thus forming the circuit identical to that shown in FIG. 1. The SAW filter 137 includes SAW filters 114 and 115 assembled in a package.

Since including such components integrated, the high-frequency device of embodiment 2 can have an overall size smaller than that of embodiment 1, thus being applicable to mobile communications apparatuses more.

The capacitor 121 and the inductor 122 may be formed integrally with the ceramic layers and the conductive layers as one element. This arrangement allows the high-frequency device to have a reduced number of components and a reduced cost for mounting process, while allowing the device to have the same effect of protection from high-voltage noises as that of the high-frequency device of embodiment 1.

(Embodiment 3)

Figure 3:
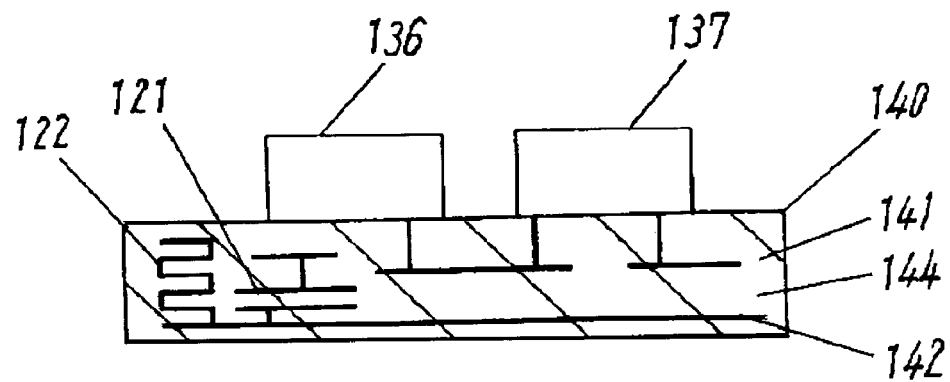
FIG. 3 is a cross sectional view of the high-frequency device according to embodiment 3.

FIG. 3 is a cross sectional view of a high-frequency device according to exemplary embodiment 3 of the present invention. A circuit of the high-frequency device is identical to that of embodiment 1 shown in FIG. 1 and will be explained in no more detail.

The high-frequency device of embodiment 3 includes a capacitor 121 and an inductor 122 having shapes different from those of embodiment 2.

According to embodiment 3, as shown in FIG. 3, an antenna terminal 110, a diplexer 111, switches 112 and 113 excluding diodes, LPFs 116 and 117, and ports 131, 132, 133, and 134 (not shown) are provided on and in a ceramic laminated substrate 140 including ceramic layers 141 and conductive patterns 142 stacked alternately. During the fabrication of the ceramic laminated substrate 140, the capacitor 121 is formed by forming a ceramic layer 144 made of ceramic material together with internal electrodes 145 in the substrate 140 simultaneously to forming of the inductor 122. Then, a diode 136 and a SAW filter 137 are mounted on the ceramic laminated substrate 140, hence forming the circuit shown in FIG. 1. The SAW filter 137 includes SAW filters 114 and 115 assembled in a single package.

Accordingly, the high-frequency device of embodiment 3 can have an overall size smaller than the device of embodiment 2, thus being applicable to mobile communications apparatuses more. The capacitor and the inductor is not needed to mount after the forming of the ceramic laminated substrate 140, thus enabling the high-frequency device of embodiment 3 to be fabricated at a high productivity.

According to embodiments 1 to 3, the capacitor 121 and the inductor 122 are connected between the antenna terminal 110 and the diplexer 111. More particularly, the capacitor 121 and the inductor 122 are connected in parallel to each other so that respective one ends of them are connected between the antenna terminal 110 and the SAW filters 114 and 115, and respective other ends of them are connected to the grounding terminal 123. As being located close to the antenna terminal 110 in the circuit according to embodiments 1 to 3, the capacitor 121 and the inductor 122 can protect the switches 112 and 113 including the diodes securely as well as the SAW filters 114 and 115.

(Embodiment 4)

Figure 7:
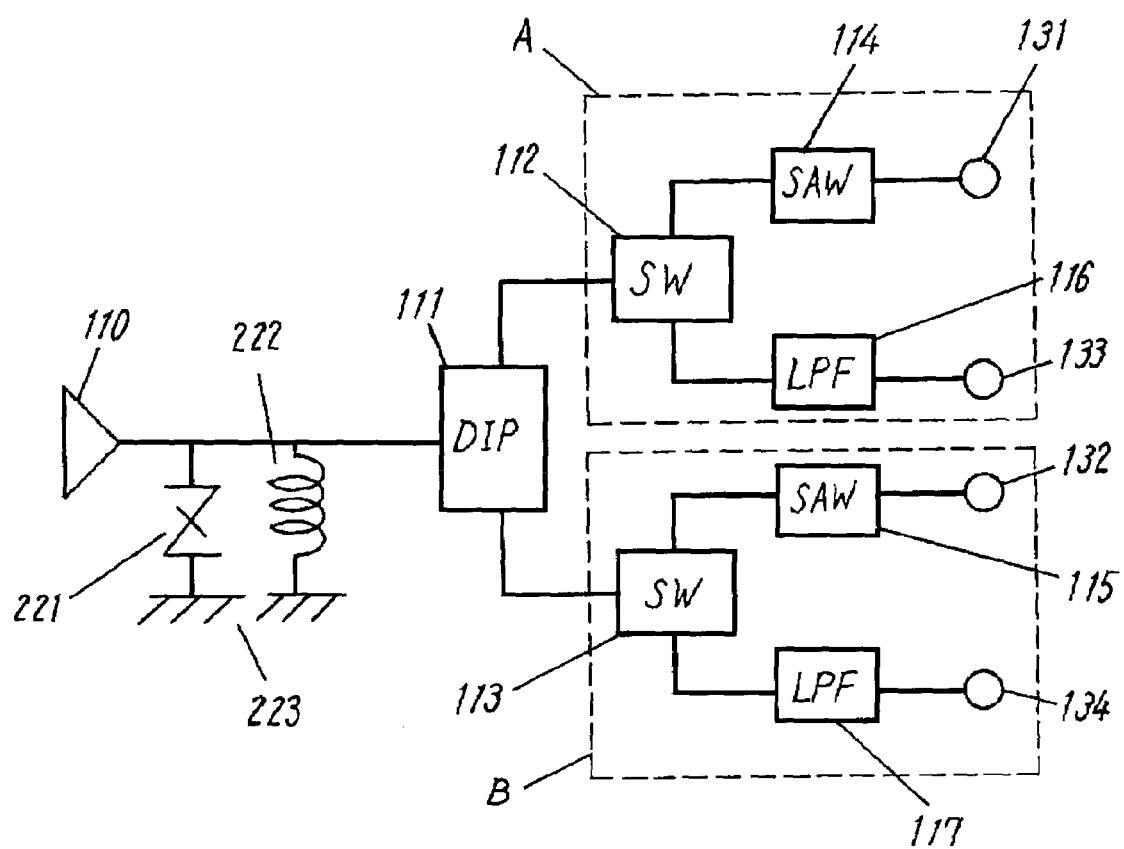
FIG. 7 is a circuit block diagram of a high-frequency device according to exemplary embodiments 4 to 6 of the invention.

FIG. 7 is a circuit block diagram of a high-frequency device according to exemplary embodiment 4 of the present invention. Like components are denoted by like numerals as those of embodiment 1 and will be explained in no more detail. In the high-frequency device of embodiment 4, a varistor 221 functioning as a capacitance element having a capacitance of 3 pF and an inductor 222 having an inductance of 18 nH have respective ones ends connected to a signal line between an antenna terminal 110 and a diplexer 111 and respective other ends connected to a grounding terminal 223.

The capacitance of the varistor 221 and the inductance of the inductor 222 are determined similarly to a capacitance of a capacitor 121 and an inductance of an inductor 122 of embodiment 1 shown in FIG. 1.

The high-frequency device having the above structure can protect the SAW filters 114 and 115 without increasing the insertion loss of passing bands.

Figure 10:
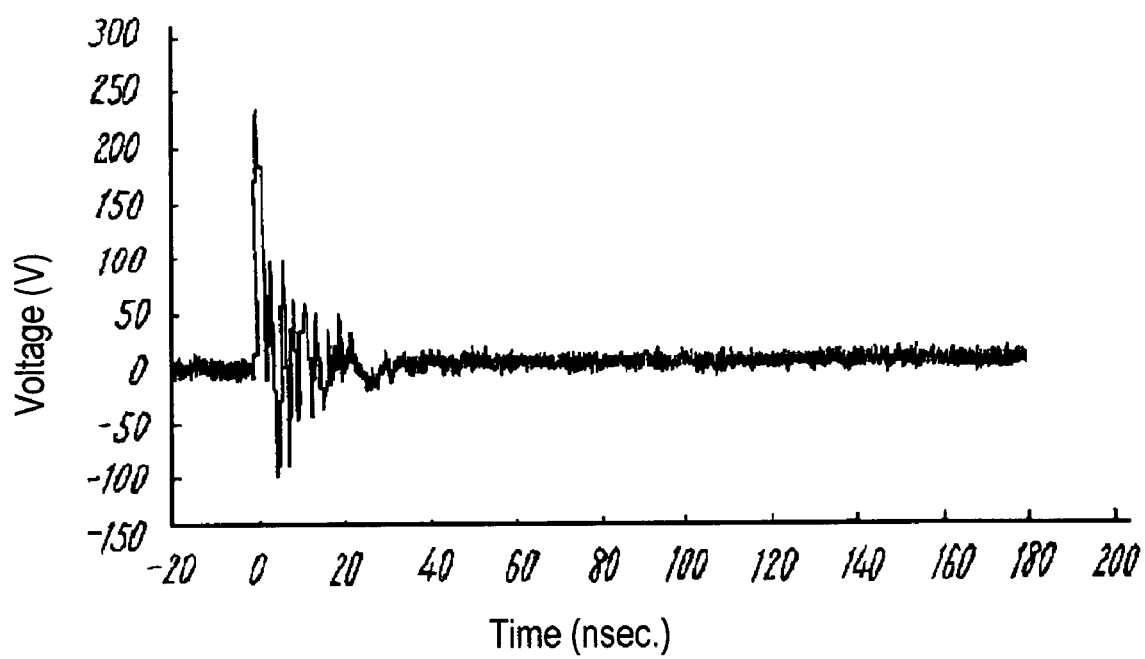
FIG. 10 illustrates a profile of eliminating a static electricity of the high-frequency device of embodiment 4.

The high-frequency device of embodiment 4 was evaluated through testing it in static electricity by a method identical to that of embodiment 1. FIG. 10 illustrates a voltage loaded to circuits after a diplexer 111 of the high-frequency device of embodiment 4 when a static electricity of 8 kV is discharged into the antenna terminal 110 by contact.

As shown in FIG. 10, the high-frequency device of embodiment 4 allows the loaded voltage to be 240V during nanoseconds which is much lower than that of comparative example 1 shown in FIG. 6.

As the loaded voltage is almost ¼ the voltage of the high-frequency device of comparative example 1, the high-frequency device of embodiment 4 can significantly reduce the loaded voltage.

More specifically, the varistor 221 and the inductor 222 connected in parallel to each other between the ground and the signal line between the antenna terminal 110 and the diplexer 111 prevent the circuits after the diplexer 111 from receiving the high voltage, and allow a desired signal to be transmitted without increasing the insertion loss at the passing bands. While a higher voltage noise, such as the static electricity, is bypassed to the grounding terminal 223 through the inductor 222, a high-frequency component at a rise of the noise which is not eliminated by the inductor 222 is attenuated by the varistor 221.

As the result, the high-frequency device of embodiment 4 can protect the switches 112 and 113 and the two SAW filters 114 and 115, which may receive an adverse effect of high-voltage noises, hence having an operational reliability improved.

(Embodiment 5)

Figure 8:
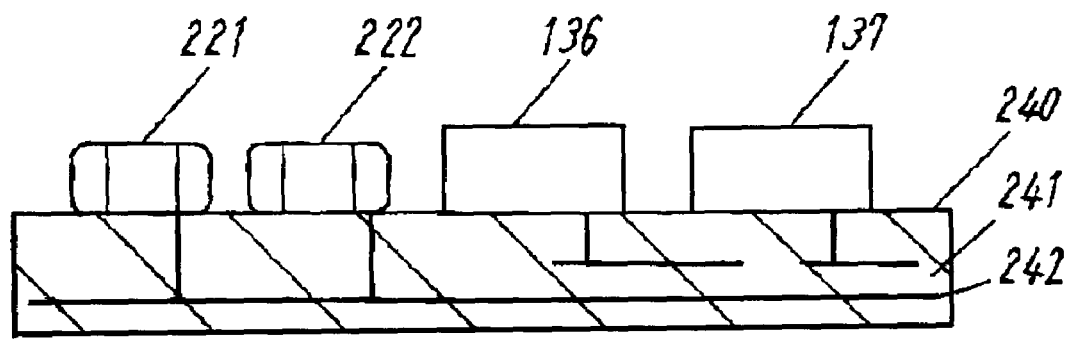
FIG. 8 is a cross sectional view of the high-frequency device according to embodiment 5.

FIG. 8 is a cross sectional view of a high-frequency device according to exemplary embodiment 5 of the present invention. A circuit of the high-frequency device is identical to that of embodiment 4 shown in FIG. 7 and will be explained in no more detail.

As shown in FIG. 8, a ceramic laminated substrate 240 includes ceramic layers 241 and conductive patterns 242 stacked alternately. An antenna terminal 110, a diplexer 111, switches 112 and 113 excluding diodes, LPFs 116 and 117, and ports 131, 132, 133, and 134 (as not shown) are provided on and in the ceramic laminated substrate 240. A diode 136, a SAW filter 137, a varistor 221, and an inductor 222 are mounted on the upper side of the ceramic laminated substrate 240, thus forming the circuit shown in FIG. 7. The SAW filter 137 includes SAW filters 114 and 115 assembled in a package.

Since including such components integrated, the high-frequency device of embodiment 5 can have an overall size smaller than that of embodiment 4, thus being applicable to mobile communications apparatuses more.

The varistor 221 and the inductor 222 may be formed integrally with the ceramic layers and the conductive layers as one element. This arrangement allows the high-frequency device to have a reduced number of components and a reduced cost for mounting process, while allowing the device to have the same effect of protection from high-voltage noises as that of the high-frequency device of embodiment 4.

(Embodiment 6)

Figure 9:
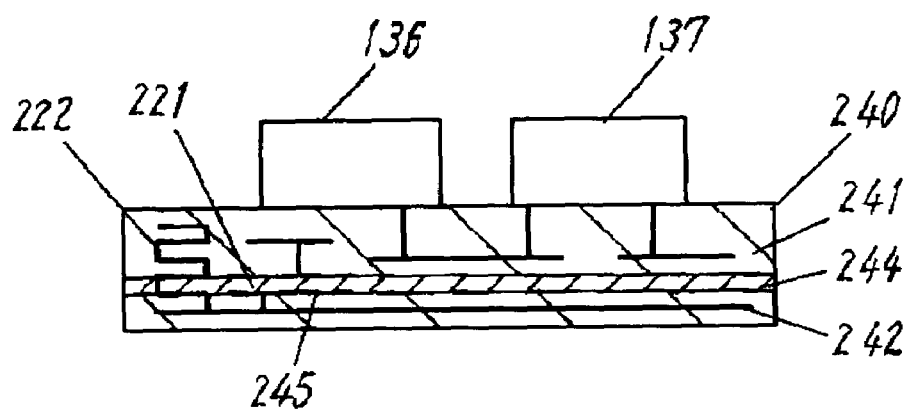
FIG. 9 is a cross sectional view of the high-frequency device according to embodiment 6.

FIG. 9 is a cross sectional view of a high-frequency device according to exemplary embodiment 6 of the present invention. A circuit of the high-frequency device is identical to that of embodiment 4 shown in FIG. 7 and will be explained in no more detail.

The high-frequency device of embodiment 6 includes a varistor 221 and an inductor 222 having shapes different from those of embodiment 5.

According to embodiment 6, as shown in FIG. 9, an antenna terminal 110, a diplexer 111, switches 112 and 113 excluding diodes, LPFs 116 and 117, and ports 131, 132, 133, and 134 (not shown) are provided on and in a ceramic laminated substrate 240 including ceramic layers 241 and conductive patterns 242 stacked alternately. During the fabrication of the ceramic laminated substrate 240, the varistor 221 is formed by forming a ceramic layer 244 made of varistor material together with internal electrodes 245 in the substrate 240 simultaneously to the forming of the inductor 222. Then, a diode 136 and a SAW filter 137 are mounted on the ceramic laminated substrate 240, hence forming the circuit shown in FIG. 7. The SAW filter 137 includes SAW filters 114 and 115 assembled in a single package.

Accordingly, the high-frequency device of embodiment 6 can have an overall size smaller than the device of embodiment 5, thus being applicable to mobile communications apparatuses more. The varistor 221 and the inductor 222 is not needed to mount after the forming of the ceramic laminated substrate 240, thus enabling the high-frequency device of embodiment 6 to be fabricated at a high productivity.

According to embodiments 4 to 6, the varistor 221 and the inductor 222 are connected between the antenna terminal 110 and the diplexer 111. More particularly, the varistor 221 and the inductor 222 are connected in parallel to each other so that respective one ends are connected between the antenna terminal 110 and the SAW filters 114 and 115, respective other ends are connected to the grounding terminal 223. As being located close to the antenna terminal 110 in the circuit according to embodiments 4 to 6, the varistor 221 and the inductor 222 protect the circuits including the diodes of the switches 112 and 113 securely as well as the SAW filters 114 and 115.

The high-frequency devices according to embodiments 1 to 6 are designed for use in, but not limited to, the GSM/DCS dual band system. The devices are applicable to either single band and triple band communications apparatuses.

The high-frequency devices according to embodiments 1 to 6 includes the SAW filters 114 and 115, but may includes other type of filter, such as a dielectric filter, instead of at least one of the SAW filters. The switches 112 and 113 include the diodes as the semiconductor elements, but may includes other semiconductor elements, such as GaAs field effect transistors.

(Embodiment 7)

Figure 11:
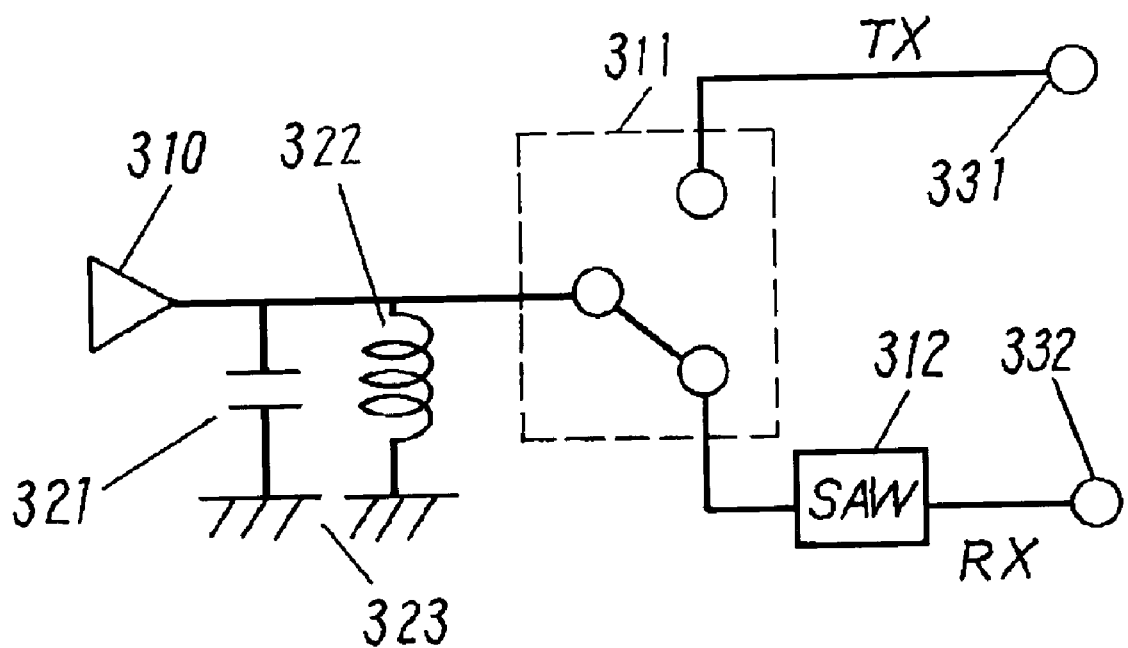
FIG. 11 is a circuit block diagram of a high-frequency device according to exemplary embodiments 7 to 9 of the invention.

FIG. 11 is a circuit block diagram of a high-frequency device according to exemplary embodiment 7 of the present invention. The high-frequency device can be used as an antenna duplexer in a GSM mobile telephone of the European mobile telephone system. An antenna terminal 310 is connected to a switch 311 for switching a transmission and a reception. The switch 311 is a semiconductor switch connected to a transmission terminal 331 and to a SAW filter 312 and a reception terminal 332.

Respective one ends of a capacitor 321 having a capacitance of 3 pF and an inductor 322 having an inductance of 18 nH are connected to a signal line between the antenna terminal 310 and the switch 311. Respective other ends of the capacitor 321 and the inductor 322 are connected to a grounding terminal 323.

The capacitance of the capacitor 321 and the inductance of the inductor 322 are determined similarly to a capacitance of a capacitor 121 and an inductance of an inductor 122 according to embodiment 1 shown in FIG. 1.

The high-frequency device having the above structure can protect the SAW filter 312 without increasing the insertion loss of a passing band.

Figure 14:
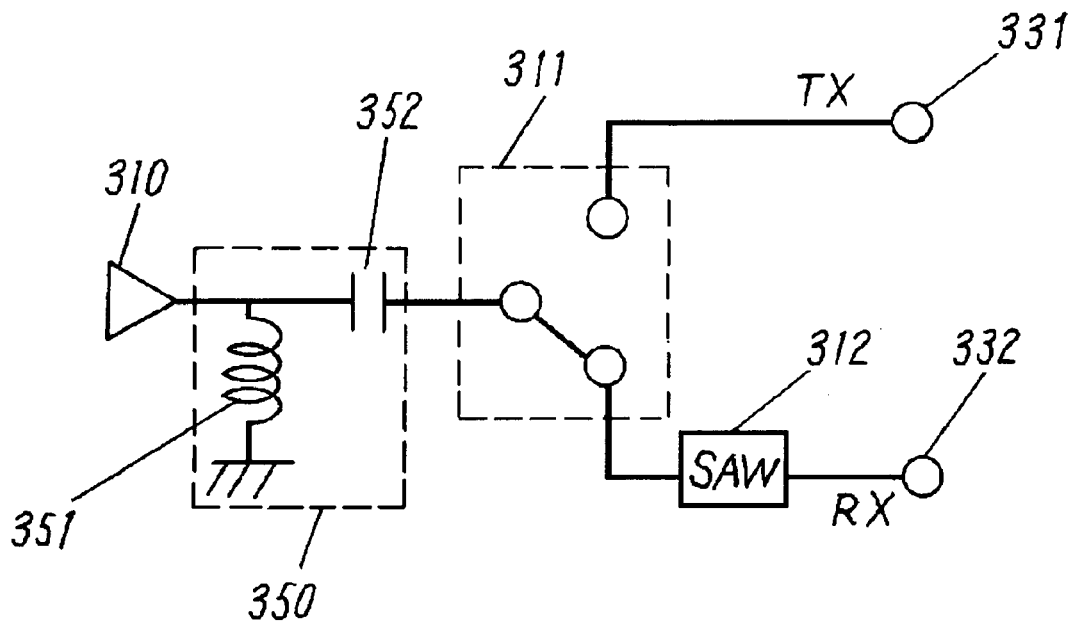
FIG. 14 is a circuit diagram of a high-frequency device of comparative example 2.

For verifying effects of the high-frequency device of embodiment 7, a high-frequency device of comparative example 2 including a high pass filter (HPF) 350 shown in FIG. 14 was prepared. Portions of the high-frequency device of comparative example 2 other than the HPF 350 is identical to those of the high-frequency device of embodiment 7 shown in FIG. 11. An inductance of an inductor 351 and a capacitance of a capacitor 352 of the HPF 350 were determined similarly to an inductance of an inductor 151 and a capacitance of a capacitor 152 of comparative example 1 shown in FIG. 4. The high-frequency device of comparative example 2, similarly to that of comparative example 1, failed to completely eliminate a high-voltage component of a static electricity.

Figure 15:
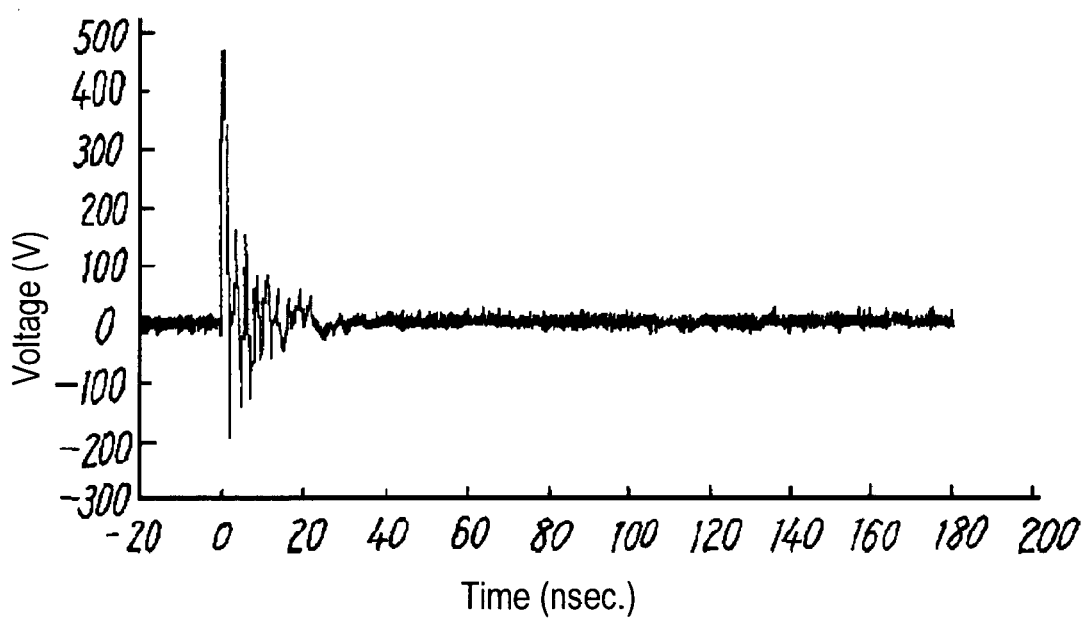
FIG. 15 illustrates a profile of eliminating a static electricity of the high-frequency device of embodiment 7.
Figure 16:
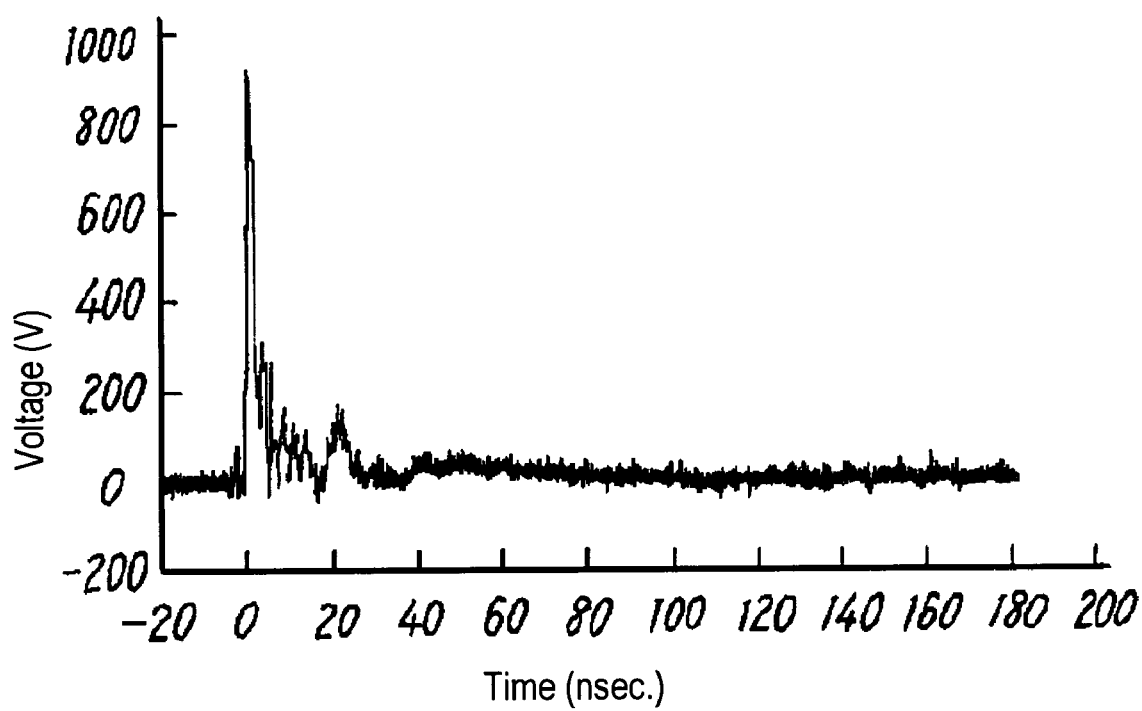
FIG. 16 illustrates a profile of eliminating a static electricity of the high-frequency device of comparative example 2 shown in FIG. 14.

The high-frequency devices of embodiment 7 and comparative example 2 were evaluated through testing them in static electricity by a method identical to that of embodiment 1. FIGS. 15 and 16 illustrate the voltage loaded to circuits after the switch 311 in the high-frequency device of embodiment 7 and the high-frequency device of comparative example 2, respectively, when a static electricity of 8 kV is discharged into the antenna terminal 310 by contact.

As shown in FIG. 15, the high-frequency device of embodiment 7 allows the loaded voltage to be about 470V during nanoseconds. The high-frequency device of comparative example 2 however permits the loaded voltage of 950 V during nanoseconds, as shown in FIG. 16.

As the loaded voltage is almost a half the voltage for the high-frequency device of comparative example 2, the high-frequency device of embodiment 7can significantly reduce the loaded voltage.

More specifically, the capacitor 321 and the inductor 322 connected in parallel to each other between the ground and the signal line between the antenna terminal 310 and the switch 311 allows the switch 311 and the SAW filter 312 prevent the switch 311 and the SAW filter 312 from receiving e high voltage, and allow a desired signal to be transmitted without increasing the insertion loss at the passing band. While a high voltage noise, such as the static electricity, is bypassed to the grounding terminal 323 through the inductor 322, a high-frequency component at a rise of the noise which is not eliminated by the inductor 322 is attenuated by the capacitor 321.

As a result, the high-frequency device of embodiment 7 can protect the switch 311 and the SAW filter 312, which may receive an adverse effect of high-voltage noises, securely, hence having an operational reliability improved.

(Embodiment 8)

Figure 12:
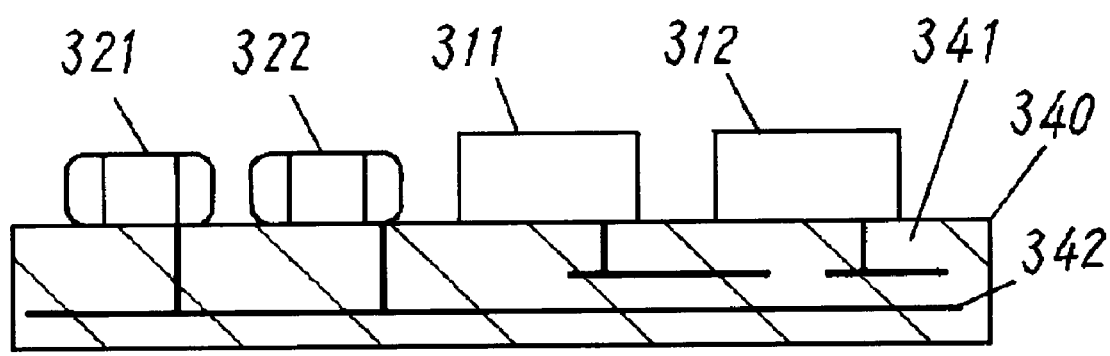
FIG. 12 is a cross sectional view of the high-frequency device according to embodiment 8.

FIG. 12 is a cross sectional view of a high-frequency device according to exemplary embodiment 8 of the present invention. A circuit of the high-frequency device is identical to that of embodiment 7 shown in FIG. 11 and will be explained in no more detail.

As shown in FIG. 12, a ceramic laminated substrate 340 includes ceramic layers 341 and conductive patterns 342 stacked alternately. An antenna terminal 310, a transmission terminal 331, a reception terminal 332, and a pattern of wiring (not shown) for connection between components and terminals are provided on and in the ceramic laminated substrate 340. A switch 311 of a GaAs field effect transistor, a SAW filter 312, a capacitor 321, and an inductor 322 are mounted on the upper side of the ceramic laminated substrate 340, thus forming the circuit shown in FIG. 11.

Since including such components integrated, the high-frequency device of embodiment 8 can have an overall size smaller than that of embodiment 7, thus being applicable to mobile communications apparatuses more.

The capacitor 321 and the inductor 322 may be formed integrally with the ceramic layers and the conductive layers as one element. This arrangement allows the high-frequency device to have a reduced number of components and a reduced cost of mounting process while allowing the device to have the same effect of protection from high-voltage noises as that of the high-frequency device of embodiment 7.

(Embodiment 9)

Figure 13:
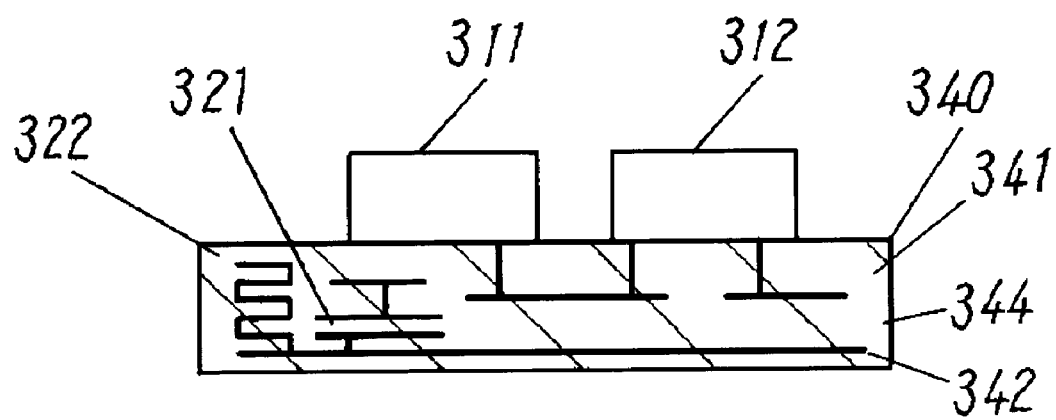
FIG. 13 is a cross sectional view of the high-frequency device according to embodiment 9.

FIG. 13 is a cross sectional view of a high-frequency device according to exemplary embodiment 9 of the present invention. A circuit of the high-frequency device is identical to that of embodiment 7 shown in FIG. 11 and will be explained in no more detail.

The high-frequency device of embodiment 9 includes a capacitor 321 and an inductor 322 having shapes different from those of embodiment 8.

According to embodiment 9, as shown in FIG. 13, an antenna terminal 310, a transmission terminal 331, a reception terminal 332, and a pattern of wiring (not shown) for connection between components and the terminals are provided on and in a ceramic laminated substrate 340 including ceramic layers 341 and conductive patterns 342 stacked alternately. During the fabrication of the ceramic laminated substrate 340, the capacitor 321 is formed by forming a ceramic layer 344 made of dielectric material together with internal electrodes 345 in the substrate 340 simultaneously to the forming of the inductor 322. Then, an FET switch 311 and a SAW filter 312 are mounted on the ceramic laminated substrate 340, hence forming the circuit shown in FIG. 11.

Accordingly, the high-frequency device of embodiment 9 can have an overall size smaller than the device of embodiment 8, thus being applicable to mobile communications apparatuses more. The capacitor 321 and the inductor 322 is not needed to mount after the forming of the ceramic laminated substrate 340, thus enabling the high-frequency device of embodiment 9 to be fabricated at a high productivity.

According to embodiments 7 to 9, the capacitor 321 and the inductor 322 are connected between the antenna terminal 310 and the switch 311. More particularly, the capacitor 321 and the inductor 322 are connected in parallel to each other so that respective one ends of them are connected between the antenna terminal 310 and the SAW filter 312, and respective other ends of them are connected to the grounding terminal 323. As being located close to the antenna terminal 310 according to embodiments 7 to 9, the capacitor 321 and the inductor 322 protect the circuit including the switch 311 securely as well as the SAW filter 312.

(Embodiment 10)

Figure 17:
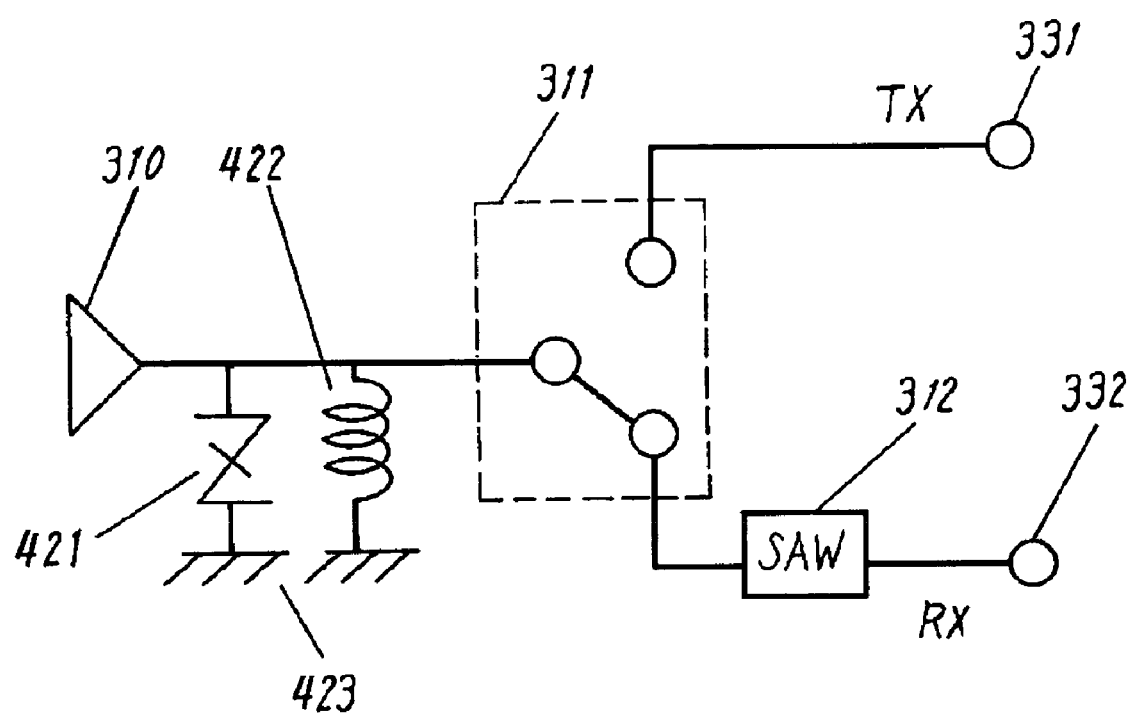
FIG. 17 is a circuit block diagram of a high-frequency device according to exemplary embodiments 10 to 12 of the invention.

FIG. 17 is a circuit block diagram of a high-frequency device according to exemplary embodiment 10 of the present invention. Like components are denoted by like numerals as those of embodiment 7 and will be explained in no more detail. In the high-frequency device of embodiment 10, a varistor 421 having a capacitance of 3 pF and an inductor 422 having an inductance of 18 nH have respective one ends connected to a signal line between an antenna terminal 310 and a diplexer 311, and have respective other ends connected to a grounding terminal 423.

The capacitance of the varistor 421 and the inductance of the inductor 422 are determined similarly to a capacitance of a capacitor 121 and an inductance of an inductor 122 according to embodiment 1 shown in FIG. 1.

The high-frequency device having the above structure can protect the SAW filter 312 without increasing an insertion loss at a passing band.

Figure 20:
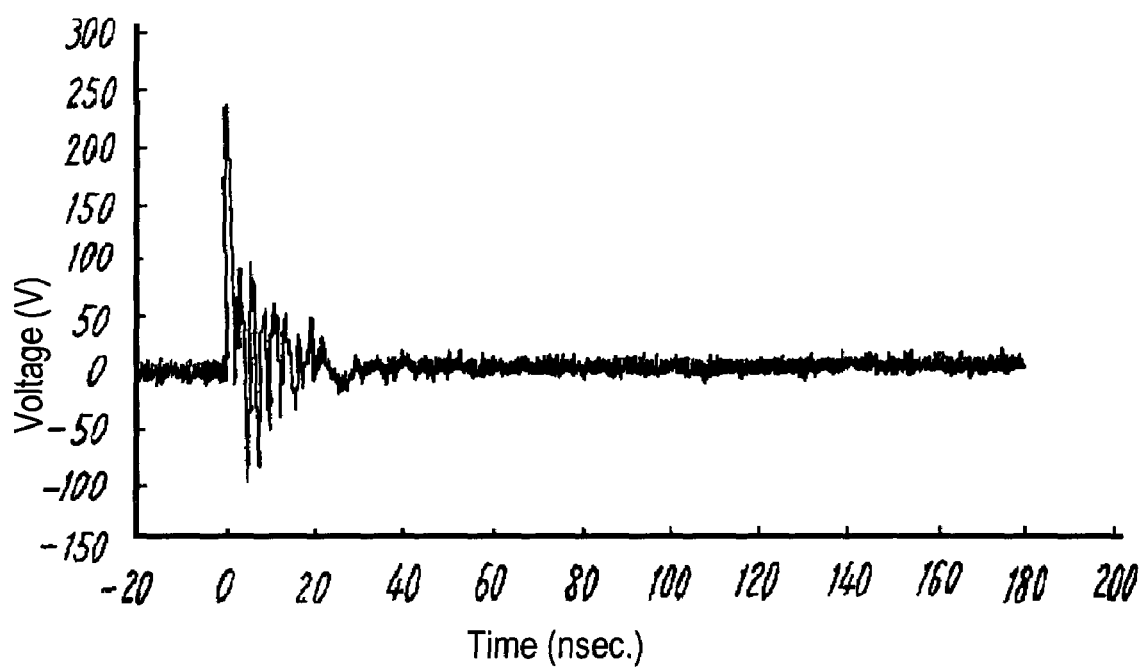
FIG. 20 illustrates a profile of eliminating a static electricity of the high-frequency device of embodiment 10.

The high-frequency device of embodiment 10 was evaluated through testing it in static electricity by a method identical to that of embodiment 1. FIG. 20 illustrates a voltage loaded to circuits after the switch 311 of the high-frequency device of embodiment 10 when a static electricity of 8 kV is discharged into the antenna terminal 310 by contact.

As shown in FIG. 20, the high-frequency device of embodiment 10 allows the loaded voltage to be 240V during nanoseconds which is much lower than that of comparative example 2 shown in FIG. 16.

As the loaded voltage is almost ¼ the voltage for the high-frequency device of comparative example 2, the high-frequency device of embodiment 10 can significantly reduce the loaded voltage.

More specifically, the varistor 421 and the inductor 422 connected in parallel to each other between the ground and the signal line between the antenna terminal 310 and the switch 311 prevent the switch 311 and the SAW filter 312 from receiving such high voltage, and allows a desired signal to be transmitted without increasing the insertion loss at the passing band. While a high voltage noise, such as the static electricity, is bypassed to the grounding terminal 423 through the inductor 422, a high-frequency component at a rise of the noise which is not eliminated by the inductor 422 is attenuated by the varistor 421.

As a result, the high-frequency device of embodiment 10 can protect the switch 311 and the SAW filter 312, which may receive an adverse effect of high-voltage noises, hence having an operational reliability improved.

(Embodiment 11)

Figure 18:
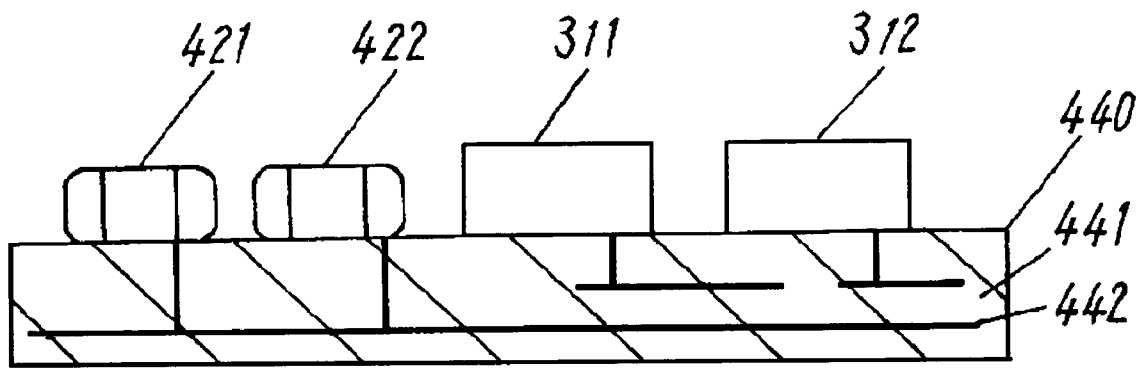
FIG. 18 is a cross sectional view of the high-frequency device according to embodiment 11.

FIG. 18 is a cross sectional view of a high-frequency device according to exemplary embodiment 11 of the present invention. A circuit of the high-frequency device is identical to that of embodiment 10 shown in FIG. 17 and will be explained in no more detail.

As shown in FIG. 18, a ceramic laminated substrate 440 includes ceramic layers 441 and conductive patterns 442 stacked alternately. An antenna terminal 310, a transmission terminal 331, a reception terminal 332, and a pattern of wiring (not shown) for connecting between components and the terminals are provided on and in the ceramic laminated substrate 440. A switch 311 of a GaAs field effect transistor (FET), a SAW filter 312, a varistor 421, and an inductor 422 are mounted on the upper side of the ceramic laminated substrate 440, thus forming the circuit shown in FIG. 17.

Since including such components integrated, the high-frequency device of embodiment 11 can have an overall size smaller than that of embodiment 10, thus being applicable to mobile communications apparatuses more.

The varistor 421 and the inductor 422 may be formed integrally with the ceramic layers and the conductive layers as one element. This arrangement allows the high-frequency device to have a reduced number of components and a reduced cost of mounting process, while allowing the device to have the same effect of protection from high-voltage noises as that of the high-frequency device of embodiment 10.

(Embodiment 12)

Figure 19:
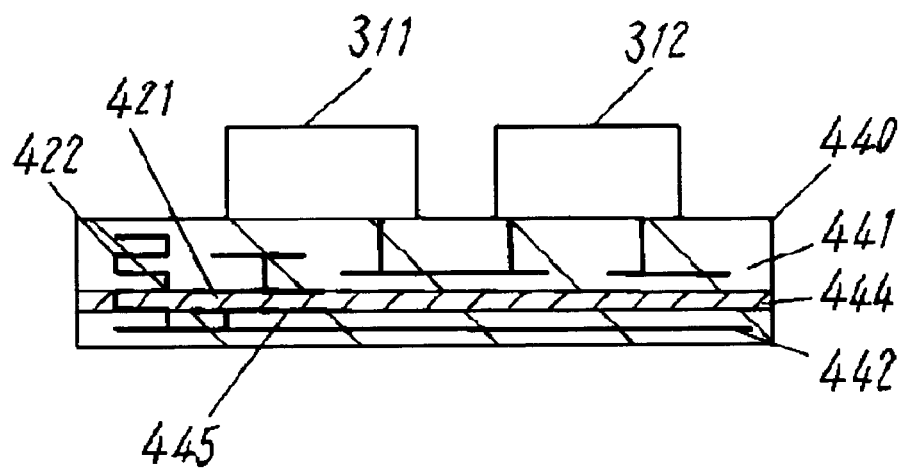
FIG. 19 is a cross sectional view of the high-frequency device according to embodiment 12.

FIG. 19 is a cross sectional view of a high-frequency device according to exemplary embodiment 12 of the present invention. A circuit of the high-frequency device is identical to that of embodiment 10 shown in FIG. 17 and will be explained in no more detail.

The high-frequency device of embodiment 12 includes a varistor 421 and an inductor 422 having shapes different from those of embodiment 11.

As shown in FIG. 19, the high-frequency device of embodiment 12 includes a ceramic laminated substrate 440 including ceramic layers 441 and conductive patterns 442 stacked alternately. A transmission terminal 331, a reception terminal 332, and a pattern of wiring (not shown) for connecting between components and the terminals are provided on and in which an antenna terminal 310. During the fabrication of the ceramic laminated substrate 440, the varistor 421 is formed by forming a ceramic layer 444 made of varistor material together with internal electrodes 445 in the substrate 440 simultaneously to the forming of the inductor 422. Then, an FET switch 311 and a SAW filter 312 are mounted on the ceramic laminated substrate 440, hence forming the circuit shown in FIG. 17.

Accordingly, the high-frequency device of embodiment 12 can have an overall size smaller than the device of embodiment 11, thus being applicable to mobile communications apparatuses more. The varistor 421 and the inductor 422 is not needed to mount after the forming of the ceramic laminated substrate 440, the high-frequency device of embodiment 12 can be fabricated at a high productivity.

According to embodiments 10 to 12, the varistor 421 and the inductor 422 are connected between the antenna terminal 310 and the switch 311. More particularly, the varistor 421 and the inductor 422 are connected in parallel to each other so that respective one ends of them are connected between the antenna terminal 310 and the SAW filter 312, and respective other ends of them are connected to the grounding terminal 423. As being located close to the antenna terminal 310 in the circuit according to embodiments 10 to 12, the varistor 421 and the inductor 422 protect the circuit including the switch 311 securely as well as the SAW filter 312.

The high-frequency devices of embodiments 7 to 12 are designed for use in, but not limited to, the GSM system, but may be applicable to dual band and triple band communications apparatuses in, e.g., PDC or AMPS system.

The switch 311 includes an FET according to embodiments 7 to 12, but may be implemented by a pin diode. The SAW filter 312 may be connected at a transmission side but not at a reception side. The high-frequency device of the embodiments may include plural filters for increasing its operating accuracy. The filter may include not only the SAW filter 312 but also other filter, such as a dielectric filter.

(Embodiment 13)

Figure 21:
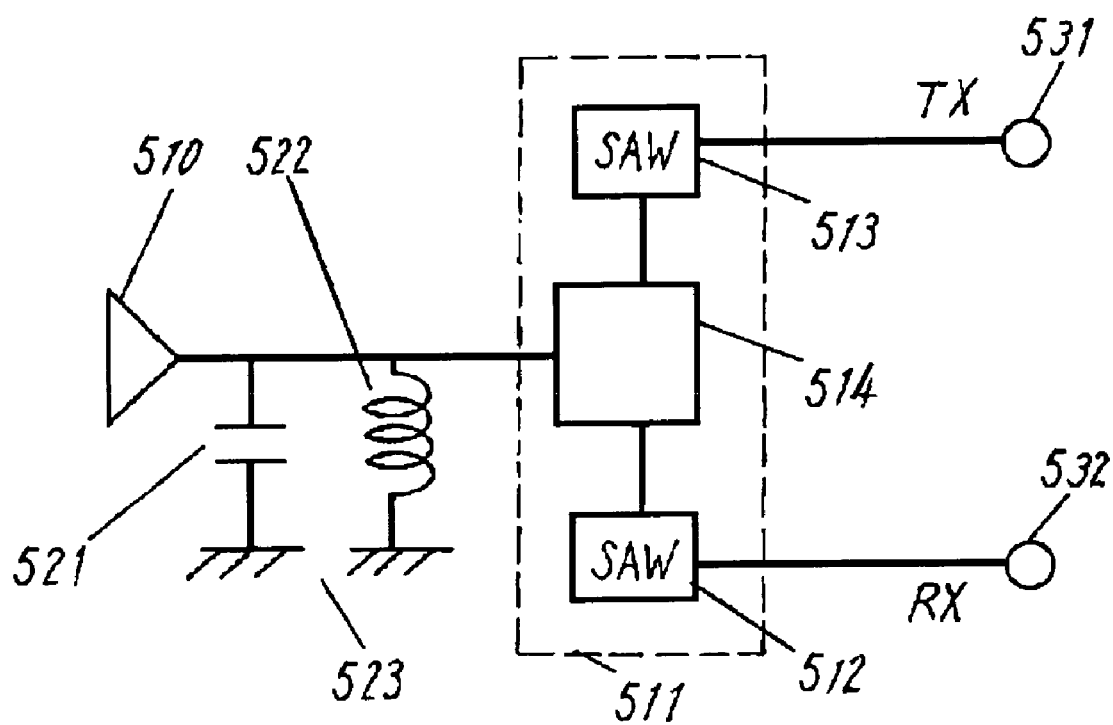
FIG. 21 is a circuit block diagram of a high-frequency device according to exemplary embodiments 13 to 15 of the invention.

FIG. 21 is a circuit block diagram of a high-frequency device according to exemplary embodiment 13 of the present invention. The high-frequency device can be used as an antenna duplexer in, for example, a GSM mobile telephone of the European mobile telephone system. An antenna terminal 510 is connected to a duplexer 511 for separating GSM frequencies for transmission and reception. The duplexer 511 includes a phase shifter 514 and SAW filters 512 and 513 which are connected to a transmission terminal 531 and a reception terminal 532, respectively.

A capacitor 521 having a capacitance of 3 pF and an inductor 522 having an inductance of 18 nH have respective one ends connected to a signal line between the antenna terminal 510 and the duplexer 511. Respective other ends of the capacitor 521 and the inductor 522 are connected to a grounding terminal 523.

The capacitance of the capacitor 521 and the inductance of the inductor 522 are determined similarly to a capacitance of a capacitor 121 and an inductance of an inductor 122 of embodiment 1 shown in FIG. 1.

The high-frequency device having the above structure can protect the duplexer 511 and the SAW filters 512 and 513 without increasing an insertion loss at passing bands.

Figure 24:
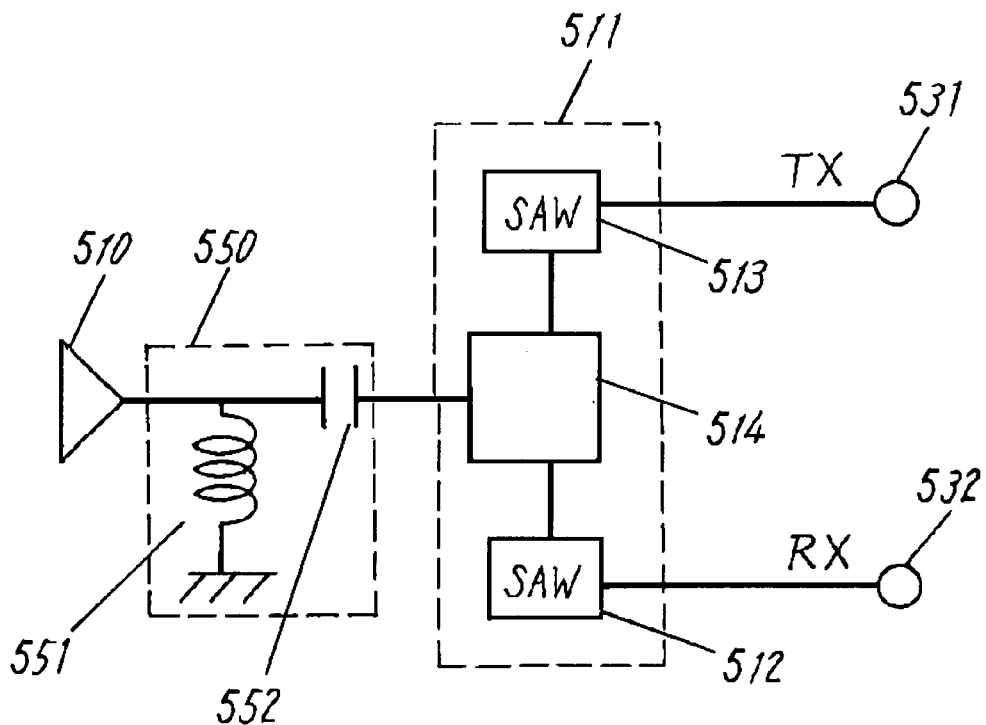
FIG. 24 is a circuit diagram of a high-frequency device of comparative example 3.

For verifying effects of the high-frequency device of embodiment 13, a high-frequency device of comparative example 3 including a high pass filter (HPF) 550 shown in FIG. 24 was fabricated. Portions of the high-frequency device of comparative example 3 other than the HPF 550 are identical to those of the high-frequency device of embodiment 13 shown in FIG. 21. An inductance of an inductor 551 and a capacitance of a capacitor 552 in the HPF 550 were determined similarly to an inductance of an inductor 151 and a capacitance of a capacitor 150 of comparative example shown in FIG. 4. The high-frequency device of comparative example 3, similarly to that of comparative example 1, failed to completely eliminate a high-voltage component of a static electricity.

Figure 25:
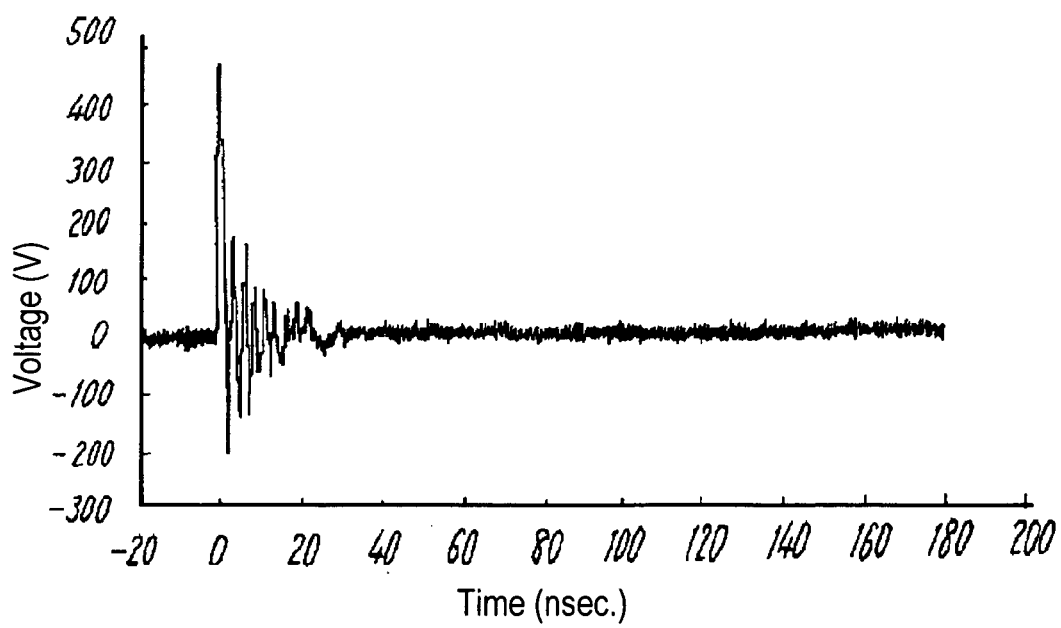
FIG. 25 illustrates a profile of eliminating a static electricity of the high-frequency device of embodiment 13.
Figure 26:
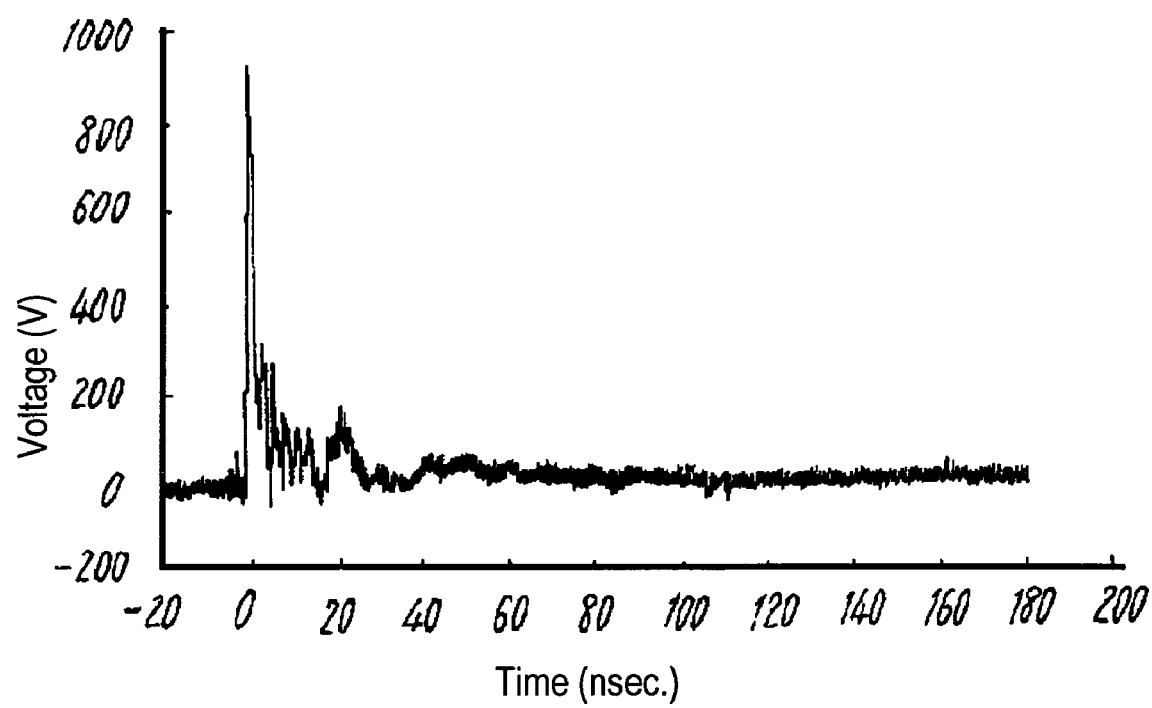
FIG. 26 illustrates a profile of eliminating a static electricity of the high-frequency device of comparative example 3 shown in FIG. 24.

The high-frequency devices of embodiment 13 and comparative example 3 were evaluated through testing them in static electricity by a method identical to that of embodiment 1. FIGS. 25 and 26 illustrate voltages loaded to circuits after the duplexer 511 of the high-frequency device of embodiment 13 and the high-frequency device of comparative example 3, respectively, when a static electricity of 8 kV is discharged into the antenna terminal 510 by contact.

As shown in FIG. 25, the high-frequency device of embodiment 13 allows the loaded voltage to be 470V during nanoseconds. The high-frequency device of comparative example 3 however permits the loaded voltage of 950V during nanoseconds, as shown in FIG. 26.

As the loaded voltage is almost a half the voltage for the high-frequency device of comparative example 3, the high-frequency device of embodiment 13 can significantly reduce the loaded voltage.

More specifically, the capacitor 521 and the inductor 522 connected in parallel to each other between the ground and the signal line between the antenna terminal 510 and the duplexer 511 prevent the circuits after the duplexer 511 from receiving a high voltage, and allow a desired signal to be transmitted without increasing the insertion loss at the passing bands. While a high voltage noise, such as the static electricity, is bypassed to the grounding terminal 523 through the inductor 522, a high-frequency component at a rise of the noise which is not eliminated by the inductor 522 is attenuated by the capacitor 521.

As a result, the high-frequency device of embodiment 13 can protect the duplexer 511 and the SAW filters 512 and 513 from having an adverse effect of high-voltage noises, hence having an operational reliability improved.

(Embodiment 14)

Figure 22:
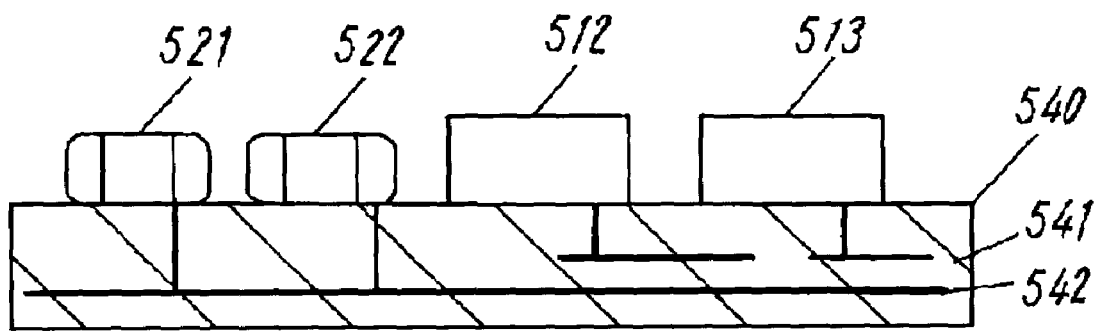
FIG. 22 is a cross sectional view of the high-frequency device according to embodiment 14.

FIG. 22 is a cross sectional view of a high-frequency device according to exemplary embodiment 14 of the present invention. A circuit of the high-frequency device is identical to that of embodiment 13 shown in FIG. 21 and will be explained in no more detail.

As shown in FIG. 22, a ceramic laminated substrate 540 includes ceramic layers 541 and conductive patterns 542 stacked alternately. An antenna terminal 510, a phase shifter 514, a transmission terminal 531, and a reception terminal 532 (as not shown) are provided on and in the ceramic laminated substrate 540. SAW filters 512 and 513, a capacitor 521, and an inductor 522 are mounted on the upper side of the ceramic laminated substrate 540, thus forming the circuit shown in FIG. 21.

Since including such components integrated, the high-frequency device of embodiment 14 have an overall size smaller than that of embodiment 13, thus being applicable to mobile communications apparatuses more.

The capacitor 521 and the inductor 522 may be formed integrally with the ceramic layers and the conductive layers as one element. This arrangement allows the high-frequency device of embodiment 14 to have a reduced number of components and a reduced cost of mounting process while allowing the device to have the same effect of protection from high-voltage noises as that of the high-frequency device of embodiment 13.

(Embodiment 15)

Figure 23:
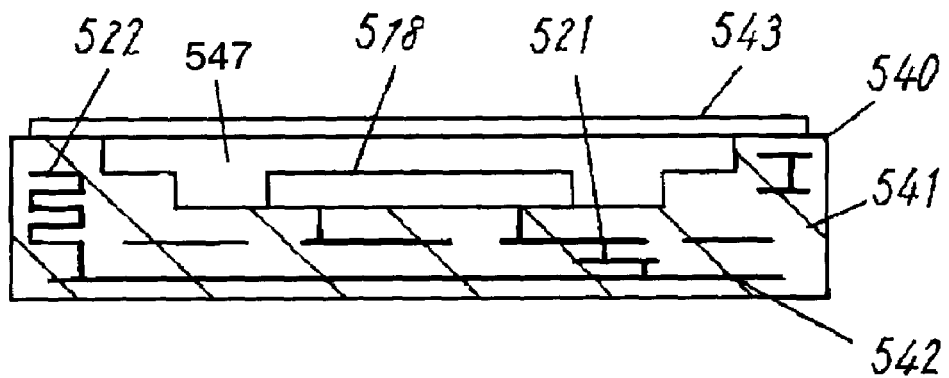
FIG. 23 is a cross sectional view of the high-frequency device according to embodiment 15.

FIG. 23 is a cross sectional view of a high-frequency device according to exemplary embodiment 15 of the present invention. A circuit of the high-frequency device is identical to that of embodiment 13 shown in FIG. 21 and will be explained in no more detail.

The high-frequency device of Embodiment 15 includes a capacitor 521 and a inductor 522 having shapes different from those of embodiment 14.

As shown in FIG. 23, the high-frequency device of embodiment 15 includes a ceramic laminated substrate 540 including ceramic layers 541 and conductive patterns 542 stacked alternately. An antenna terminal 510, a phase shifter 514, a transmission terminal 531, and a reception terminal 532 (not shown) are provided on the substrate 540. During the fabrication of the ceramic laminated substrate 540, the capacitor 521 is formed by forming a ceramic layer 544 made of capacitor material together with internal electrodes 545 in the substrate 540 simultaneously to the forming of the inductor 522. Then, a SAW filter 518 is accommodated in a recess 547 provided in the upper surface of the ceramic laminated substrate 540, hence forming the circuit shown in FIG. 21. The recess 547 is then sealed with a cover 543. The SAW filter 518 includes SAW filters 512 and 513 encapsulated in a package.

Accordingly, the high-frequency device of embodiment 15 can have an overall size smaller than the device of embodiment 14, thus being applicable to mobile communications apparatuses more. The capacitor 521 and the inductor 522 is not needed to mount after the forming of the ceramic laminated substrate 540, thus enabling the high-frequency device of embodiment 15 to be fabricated at a high productivity.

According to embodiments 13 to 15, the capacitor 521 and the inductor 522 are connected between the antenna terminal 510 and the phase shifter 514. More particularly, the capacitor 521 and the inductor 522 are connected in parallel to each other so that respective one ends of them are connected between the antenna terminal 510 and the two SAW filters 512 and 513, and respective other ends of them are connected to the grounding terminal 523. As being located close to the antenna terminal 510 in the circuit according to embodiments 13 to 15, the capacitor 521 and the inductor 522 protect the circuit after the duplexer 511.

(Embodiment 16)

Figure 27:
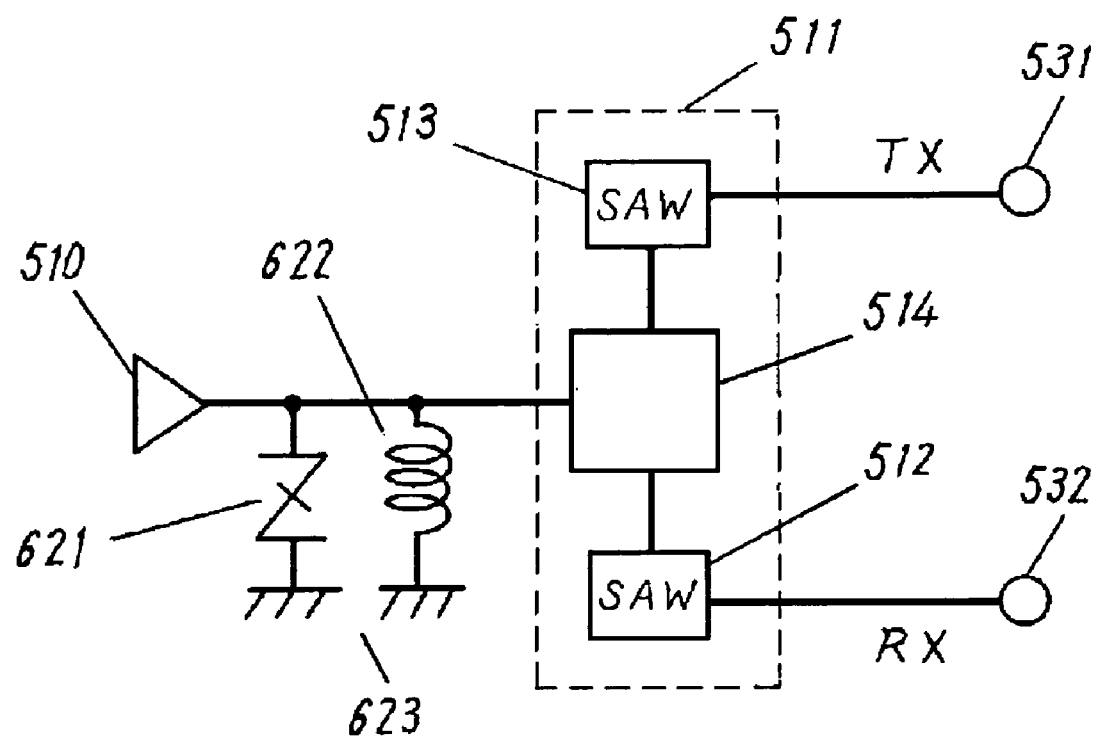
FIG. 27 is a circuit block diagram of a high-frequency device according to exemplary embodiments 16 to 18 of the invention.

FIG. 27 is a circuit block diagram of a high-frequency device according to exemplary embodiment 16 of the present invention. Like components are denoted by like numerals as those of embodiment 13 and will be explained in no more detail. In the high-frequency device of embodiment 16, a varistor 621 having a capacitance of 3 pF and an inductor 622 having an inductance of 18 nH have respective one ends connected to a signal line between an antenna terminal 510 and a duplexer 511. Respective other ends of the varistor 621 and the inductor 622 are connected to a grounding terminal 623.

The capacitance of the varistor 621 and the inductance of the inductor 622 are determined similarly to a capacitance of a capacitor 121 and an inductance of an inductor 122 in embodiment 1 shown in FIG. 1.

The high-frequency device can protect the duplexer 511, i.e., SAW filters 512 and 513 without increasing its insertion loss at passing bands.

Figure 30:
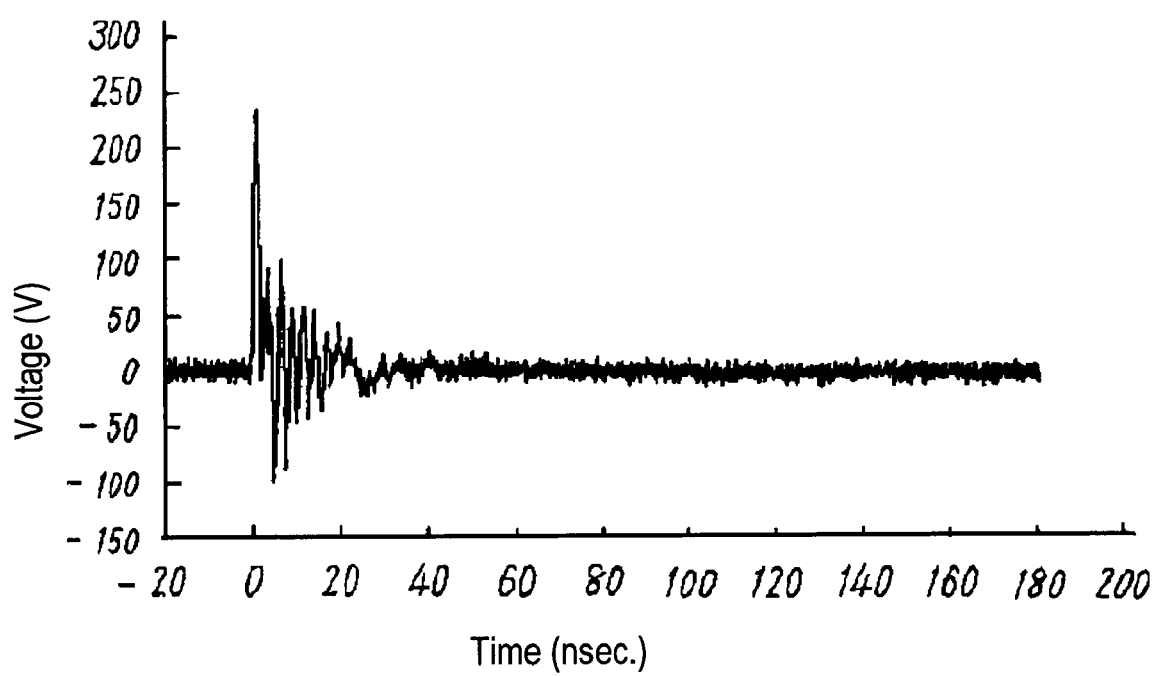
FIG. 30 illustrates a profile of eliminating a static electricity of the high-frequency device of embodiment 16.
Figure 31:
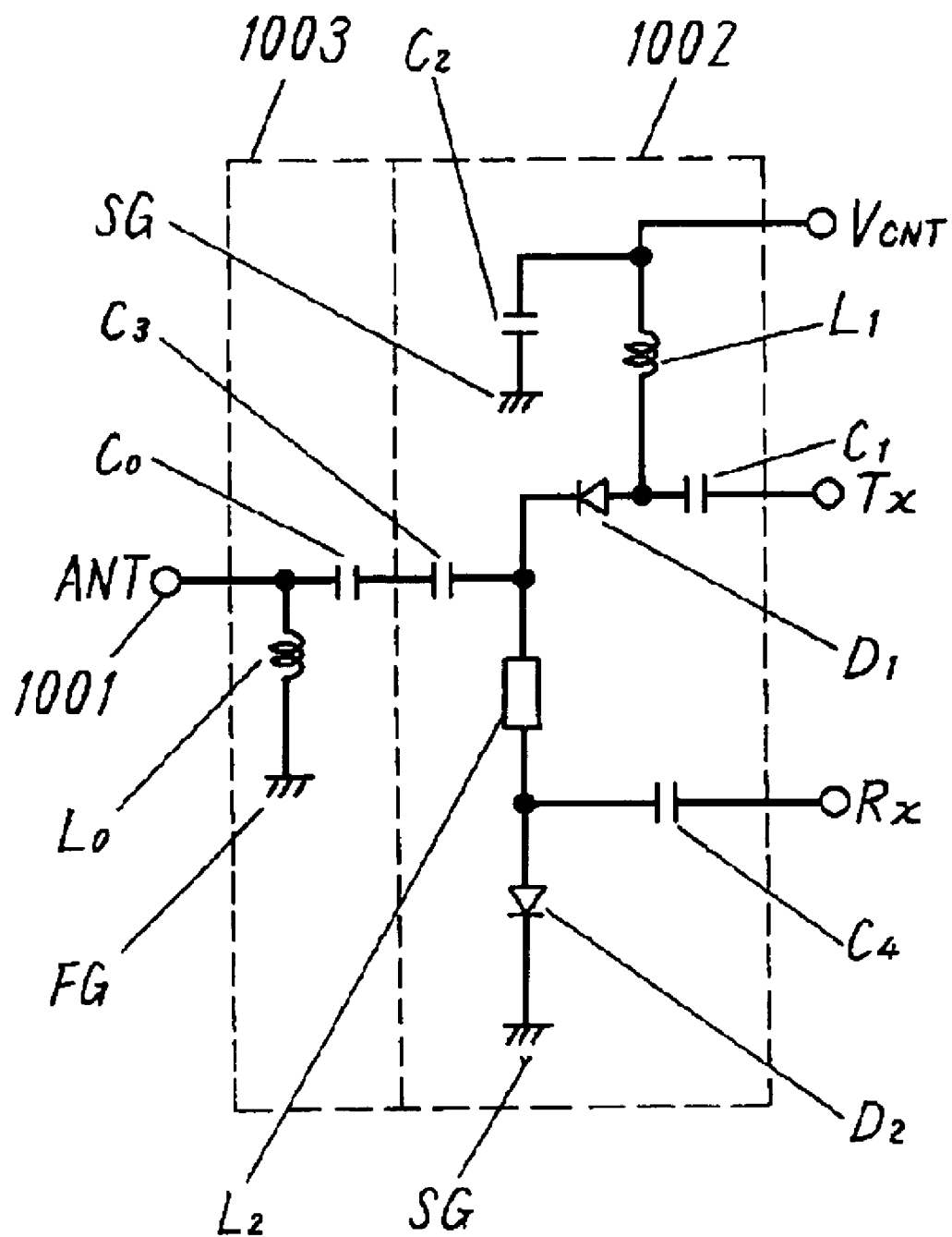
FIG. 31 is a circuit diagram of a conventional high-frequency device.

The high-frequency device of embodiment 16 was evaluated through testing it in static electricity by a method identical to that of embodiment 1. FIG. 30 illustrates a voltage loaded to a circuit after the duplexer 511 in the high-frequency device of embodiment 16 when a static electricity of 8 kV is discharged into the antenna terminal 510 by contact.

As shown in FIG. 30, the high-frequency device of embodiment 16 allows the loaded voltage to be 240V during nanoseconds which is much lower than that of comparative example 3 shown in FIG. 26.

As the loaded voltage is almost ¼ the voltage for the high-frequency device of comparative example 3, the high-frequency device of embodiment 16 can significantly reduce the loaded voltage.

More specifically, the varistor 621 and the inductor 622 connected in parallel to each other between the ground and the signal line between the antenna terminal 510 and the compatible device 511 prevent the circuit after the duplexer 511 from receiving a high voltage, and allow a desired signal to be transmitted without increasing the insertion loss at the passing bands. While a higher voltage noise, such as the static electricity, is bypassed to the grounding terminal 623 through the inductor 622, a high-frequency component at a rise of the noise which is not eliminated by the inductor 622 is attenuated by the varistor 621.

As a result, the high-frequency device of embodiment 16 can protect the duplexer 511, i.e., the SAW filters 512 and 513 from having an adverse effect of high-voltage noises, hence having an operational reliability improved.

(Embodiment 17)

Figure 28:
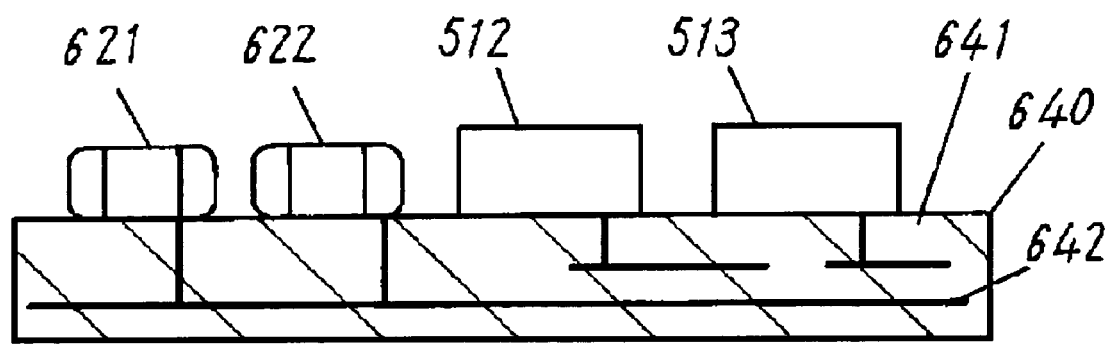
FIG. 28 is a cross sectional view of the high-frequency device according to embodiment 17.

FIG. 28 is a cross sectional view of a high-frequency device according to exemplary embodiment 17 of the present invention. A circuit of the high-frequency device is identical to that of embodiment 16 shown in FIG. 27 and will be explained in no more detail.

As shown in FIG. 28, a ceramic laminated substrate 640 includes ceramic layers 641 and conductive patterns 642 stacked alternately. An antenna terminal 510, a phase shifter 514, a transmission terminal 531, and a reception terminal 532 (not shown) are provided on and in the ceramic laminated substrate 640. SAW filters 512 and 513, a varistor 621, and an inductor 622 are mounted on the upper side of the ceramic laminated substrate 640, thus forming the circuit shown in FIG. 27.

As including components integrated, the high-frequency device of embodiment 17 can have an overall size smaller than that of embodiment 16, thus being applicable to mobile communications apparatuses more.

The varistor 621 and the inductor 622 may be formed integrally with the ceramic layers and the conductive layers as one element. This arrangement allows the high-frequency device to have a reduced number of components and a reduced cost of mounting process while allowing the device to have the same effect of protection from high-voltage noises as that of the high-frequency device of embodiment 16.

(Embodiment 18)

Figure 29:
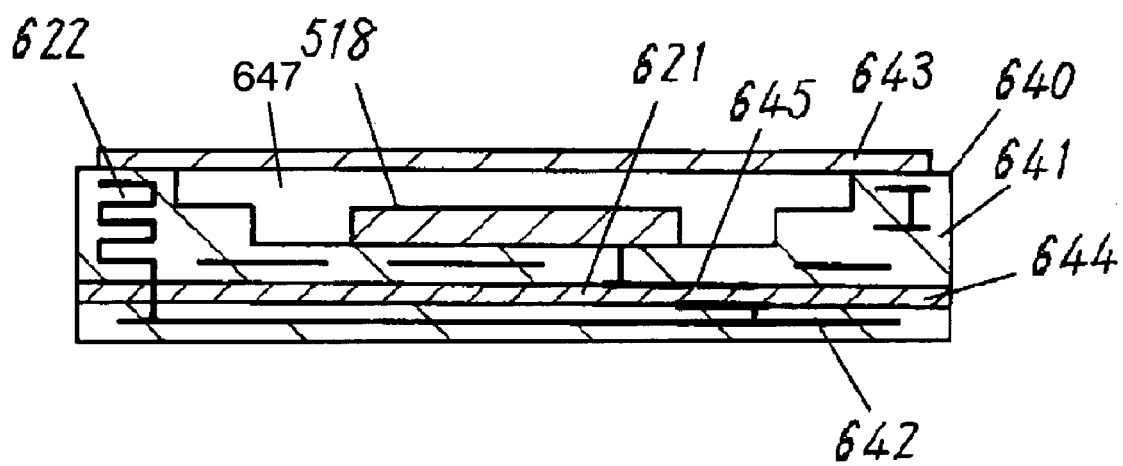
FIG. 29 is a cross sectional view of the high-frequency device according to embodiment 18.

FIG. 29 is a cross sectional view of a high-frequency device according to exemplary embodiment 18 of the present invention. A circuit of the high-frequency device is identical to that of embodiment 16 shown in FIG. 27 and will be explained in no more detail.

The high-frequency device of embodiment 18 includes a varistor 621 and an inductor 622 having shapes different from those of embodiment 17.

As shown in FIG. 29, the high-frequency device of embodiment 18 includes a ceramic laminated substrate 640 including ceramic layers 641 and conductive patterns 642 stacked alternately. An antenna terminal 510, a phase shifter 514, a transmission terminal 531, and a reception terminal 532 are provided (not shown) on the substrate 640. During the fabrication of the ceramic laminated substrate 640, the varistor 621 is formed by forming a ceramic layer 644 made of varistor material together with internal electrodes 645 in the substrate 640 simultaneously to the forming of the inductor 622. Then, a SAW filter 518 is accommodated in a recess 647 provided in the upper surface of the ceramic laminated substrate 640, hence forming the circuit shown in FIG. 27. The recess 647 is then sealed with a cover 643. The SAW filter 518 includes SAW filters 512 and 513 encapsulated in a package.

Accordingly, the high-frequency device of Embodiment 18 can have an overall size smaller than the device of embodiment 17, thus being applicable to mobile communications apparatuses more. The varistor 621 and the inductor 622 is not needed to mount after the forming of the ceramic laminated substrate 640, thus enabling the high-frequency device of embodiment 18 to be fabricated at a high productivity.

According to embodiments 16 to 18, the varistor 621 and the inductor 622 are connected between the antenna terminal 510 and the phase shifter 514. More particularly, the varistor 621 and the inductor 622 are connected in parallel to each other so that respective one ends of them are connected between the antenna terminal 510 and the SAW filters 512 and 513, and respective other ends of them are connected to the grounding terminal 623. As being located close to the antenna terminal 510 in the circuit according to embodiments 16 to 18, the varistor 621 and the inductor 622 protect the circuit after the duplexer 511.

While the high-frequency devices of embodiments 13 to 18 are designed for use in, but not limited to, the GSM system, they can be applicable to dual band or triple band communications apparatuses in, e.g., PDC or AMPS system.

The duplexer 511 includes the phase shifter 514 and the SAW filters 512 and 513 according to embodiments 13 to 18. At least one of the SAW filters may be a dielectric filter.

What is claimed is:

1. A high-frequency device comprising:
   an antenna terminal;
   a signal line connected to said antenna terminal;
   a high-frequency signal processing circuit connected to said signal line;
   a capacitance element having one end connected to said signal line and another end grounded, the capacitance element having a capacitance not larger than 10 pF; and
   an inductor connected in parallel with the capacitance element, the inductor having an inductance not smaller than 3 nH and not larger than 50 nH.

2. The high-frequency device according to claim 1, wherein said capacitance element and said inductor are formed integrally with each other.

3. The high-frequency device according to claim 1, further comprising
   a ceramic laminated substrate including a ceramic layer and a conductive pattern provided on said ceramic layer, for forming said antenna terminal, said capacitance element, and said inductor.

4. The high-frequency device according to claim 1, wherein said capacitance element is a capacitor.

5. The high-frequency device according to claim 1, wherein said capacitance element is a varistor.

6. The high-frequency device according to claim 1, wherein said high-frequency signal processing circuit includes a switch connected to said signal line.

7. The high-frequency device according to claim 6, wherein said high-frequency signal processing circuit further includes a filter connected to said switch.

8. The high-frequency device according to claim 1, wherein said high-frequency signal processing circuit includes a duplexer connected to said signal line.

9. The high-frequency device according to claim 1, wherein said high-frequency signal processing circuit includes a diplexer connected to said signal line.

* * * * *